(12) United States Patent
Delany

(10) Patent No.: US 12,461,721 B2
(45) Date of Patent: Nov. 4, 2025

(54) SYSTEM AND METHODS FOR AUTOMATED API DETERMINATION, GENERATION, AND INTEGRATION

(71) Applicant: DELANY GROUP, LLC, New Rochelle, NY (US)

(72) Inventor: Hubert Charles Delany, Easton, CT (US)

(73) Assignee: DELANY GROUP, LLC, New Rochelle, NY (US)

( * ) Notice: Subject to any disclaimer, the term of this patent is extended or adjusted under 35 U.S.C. 154(b) by 0 days.

(21) Appl. No.: 18/501,683

(22) Filed: Nov. 3, 2023

(65) Prior Publication Data
US 2024/0152337 A1    May 9, 2024

Related U.S. Application Data

(60) Provisional application No. 63/422,782, filed on Nov. 4, 2022.

(51) Int. Cl.
    *G06F 8/34*      (2018.01)
    *G06F 8/41*      (2018.01)

(52) U.S. Cl.
    CPC ................... *G06F 8/427* (2013.01)

(58) Field of Classification Search
    CPC ................... G06F 8/30; G06F 8/41
    See application file for complete search history.

(56) References Cited

U.S. PATENT DOCUMENTS

| | | | |
|---|---|---|---|
| 2010/0070360 A1 | 3/2010 | Gilbert et al. | |
| 2012/0311533 A1* | 12/2012 | Fanning | G06F 8/33 |
| | | | 717/111 |
| 2013/0167128 A1* | 6/2013 | Narayana | G06F 8/41 |
| | | | 717/143 |
| 2015/0169385 A1 | 6/2015 | Allen et al. | |
| 2015/0268938 A1* | 9/2015 | Ge | G06F 8/37 |
| | | | 717/106 |
| 2017/0177561 A1 | 6/2017 | Peng | |
| 2017/0277518 A1* | 9/2017 | Krishnan | G06F 8/35 |

(Continued)

OTHER PUBLICATIONS

International Search Report and Written Opinion to corresponding International Application No. PCT/US23/78645, 7 pages, mailed Mar. 8, 2024.

*Primary Examiner* — Duy Khuong T Nguyen
(74) *Attorney, Agent, or Firm* — Greenberg Traurig, LLP

(57) ABSTRACT

Systems and methods of the present disclosure receive source code having multiple code fragments including parts of speech having syntactic types. Based on the syntactic types, the parts of speech in each code fragment are identified to generate nodes of a parsed data tree for each code fragment. Based on the parsed data tree, a processing location for each part of speech is identified to produce, for each node, a location-aware code state indicating a first execution location or a second execution location. A software interface call between a first code segment and a second code segment is determined, the first code segment including one or more first nodes having the first execution location and the second code segment including one or more second nodes having the second execution location based on the location code states. The software interface call may be generated and inserted into the source code.

16 Claims, 7 Drawing Sheets

(56) References Cited

U.S. PATENT DOCUMENTS

| | | |
|---|---|---|
| 2018/0189347 A1 | 7/2018 | Ghafourifar et al. |
| 2019/0213057 A1 | 7/2019 | Nitta |
| 2021/0004209 A1* | 1/2021 | Holt .......................... G06F 8/10 |

* cited by examiner

SYSTEM AND METHODS FOR AUTOMATED API DETERMINATION, GENERATION, AND INTEGRATION

FIELD

The present disclosure relates to methods and systems for automating the coding process. More particularly, the field of the present disclosure relates to methods and systems for API determination, generation, and integration.

BACKGROUND

Full-stack development is complex, difficult and time consuming, due to the myriad of tasks necessary and the wide range of skill sets required. High complexity and difficulty can give rise to high cost and time of development, and difficulty in identifying programmers possessing the requisite range of skill sets and/or identifying and assembling, coordinating and managing multidisciplinary teams. The results can typically exhibit an attendant lack of flexibility due to the difficulty of making changes in a complex integrated system whose fundamental assumptions are deeply imbedded.

SUMMARY

In some embodiments, the present disclosure can be used within programming tools to reduce workload and complexity of programming of multi-tier client-server applications (e.g., mobile apps). In some embodiments, the present disclosure can be used as a training tool to guide developers how to properly partition code.

In some embodiments, for a client-server application, the present disclosure can automate the full-stack coding process by automatically determining what server calls can be made (e.g., API calls), automatically determine what arguments and return values they can have (e.g., full API), and generate code for both client and server including integration (e.g., placement of API calls within the generated code).

In some embodiments, the present disclosure includes expressing the resulting code, including back-end API calls, as source code expressed in a grammar. In some embodiments, the present disclosure includes expressing rules governing management of variables and movement of data between code segments as grammatical rules. In some embodiments, the present disclosure includes identifying a solution via enhanced parsing using a state-aware form of parser to identify a solution that conforms to the grammatical rules. In some embodiments, the present disclosure includes utilizing a run-time adaptive database schema modification mechanism to generate and incrementally improve the database schema at run-time.

In some aspects, the techniques described herein relate to a system including: at least one processor in communication with at least one non-transitory computer-readable medium having software instructions stored thereon, wherein, upon execution of the software instructions, the at least one processor is configured to: receive source code associated with at least one software application; wherein the at least one software application is configured to be executed on a combination of a client device and a server; wherein the source code includes a plurality of code fragments; wherein each code fragment of the plurality of code fragments includes a plurality of parts of speech including at least one syntactic type; wherein the at least one syntactic types includes at least one of: a statement, an expression, or a variable reference; identify, based at least in part on enhanced parsing by a decision mechanism and the at least one syntactic type, the plurality of parts of speech in each code fragment; generate at least one parsed data tree for each code fragment, the at least one parsed data tree including a plurality of nodes, each node representing at least one part of speech of the plurality of parts of speech; wherein each node includes a location-aware code state indicative of a processing location of the at least one part of speech associated with each node; identify, based at least in part on the enhanced parsing by the decision mechanism and the at least one parsed data tree for each node of each code fragment, a processing location for each part of speech; wherein the location-aware code state of each node includes a data structure defining the processing location; wherein the processing location represents: a client-side execution location including the client device, a server-side execution location including the server, or an agnostic execution location; determine, based on the at least one parsed data tree, at least one software interface call between at least one first code segment and at least one second code segment; wherein the at least one first code segment includes at least one first part of speech being associated with at least one first node having the client-side execution location and the at least one second code segment includes at least one second part of speech being associated with at least one second node having the server-side execution location based at least in part on the location code states; determine, based on the at least one first code segment and the at least one second code segment, data exchanged between the at least one first code segment and the at least one second code segment via the at least one software interface call; and insert, into the source code, the at least one software interface call configured to enable an exchange of the data.

In some aspects, the techniques described herein relate to a system, wherein the at least one processor is further configured to: receive one or more communication selections via a graphical user interface, wherein the one or more communication selections of the at least one client application is at least one client diagram is representative of the client application, and wherein the one or more application selections of the at least one server application is at least one server diagram is representative of the server application.

In some aspects, the techniques described herein relate to a system, wherein the at least one software interface call includes: at least one client reference to the at least one client application, at least one server reference to the at least one server application, a server-specific syntax, a client-specific syntax, at least one client functionality of a plurality of functionalities associated with the at least one client application, and at least one server functionality of a plurality of functionalities associated with the at least one server application.

In some aspects, the techniques described herein relate to a system, wherein the at least one processor is further configured to: receive one or more application selections via a graphical user interface, wherein the one or more application selections is a visual code diagram indicative of the plurality of code fragments for one or more parts of speech to occur between the client application and the server application.

In some aspects, the techniques described herein relate to a system, wherein the at least one processor is further configured to: generate one or more nodes by parsing the one or more application selections, wherein each node corresponds to at least one of: a server-specific syntax, a client-specific syntax, and a functionality of a plurality of functionalities associated with the application; and parsing the one or more nodes of to generate the computer-readable code.

In some aspects, the techniques described herein relate to a system, wherein the at least one processor is further configured to: assign a state to each node of the one or more nodes, wherein the state indicates that the node is associated with the client application or the server application.

In some aspects, the techniques described herein relate to a system, wherein the at least one processor is further configured to: store, in an array, the state and a location for each of the server-specific syntax, the client-specific syntax, and the functionality of the plurality of functionalities.

In some aspects, the techniques described herein relate to a system, wherein the client application is a client instance of the client application, and wherein the server application is a server instance of the server application.

In some aspects, the techniques described herein relate to a system, wherein the at least one processor is further configured to: identifying a natural language ending at each code fragment; parsing, based on initial analysis state, at each natural language ending, a subset of the plurality of code fragments associated with at least one functional communication to extract the at least one parsed data tree of location-aware code states; and storing, based on the parsing, the at least one parsed data tree of location-aware code states.

In some aspects, the techniques described herein relate to a system, wherein the at least one processor is further configured to: identifying, in the plurality of code fragments, one or more internal system global variables including one or more types and one or more locations; and allocating the initial analysis state based on the one or more internal system global variables including the one or more types and the one or more locations.

In some aspects, the techniques described herein relate to a system, wherein the at least one processor is further configured to: assign a state to each node of the one or more nodes, wherein the assigned state includes at least one of: a start state based on one or more first characters before a natural language input, an end state based on one or more second characters after the natural language input, and a self-analysis state based on the natural language input.

In some aspects, the techniques described herein relate to a system, wherein generating the computer-readable code includes: generate, based on the at least one software interface call, a first set of computer-readable code including a plurality of: at least one client software interface call to be executed by the at least one client application at the at least one client device to cause the at least one client application to perform at least one first client function, the at least one server application to perform the at least one first server function, or both; identify a subset of the at least one software interface call to be executed by the at least one client application; and generate, based on the subset of the at least one software interface call, a second set of computer-readable code including a plurality of: at least one server software interface call to be executed by the at least one server application at the at least one server device to cause at least one of the at least one server application to perform the at least one second server function, the at least one client application to perform at least one client function, or both.

In some aspects, the techniques described herein relate to a system, wherein parsing further includes: identifying, based on a configuration file that defines functions between server-side and client-side, between the at least one functional client instruction, the at least one functional server instruction, and the at least one functional communication instruction.

In some aspects, the techniques described herein relate to a system, wherein the at least one processor is further configured to: update, based on changes to the natural language input, the state assigned to the node among the start state, the end state, and the self-analysis state.

In some aspects, the techniques described herein relate to a system, wherein generating further includes: analyze each node to identify one or more input variables and one or more output variables from at least one of: a server-specific syntax, a client-specific syntax, and a functionality of a plurality of functionalities; and generating the computer-readable code based on the one or more input variables and the one or more output variables.

In some aspects, the techniques described herein relate to a method including: receiving, by at least one processor, source code associated with at least one software application; wherein the at least one software application is configured to be executed on a combination of a client device and a server; wherein the source code includes a plurality of code fragments; wherein each code fragment of the plurality of code fragments includes a plurality of parts of speech including at least one syntactic type; wherein the at least one syntactic types includes at least one of: a statement, an expression, or a variable reference; identifying, by at least one processor based at least in part on enhanced parsing by a decision mechanism and the at least one syntactic type, the plurality of parts of speech in each code fragment; generating, by at least one processor, at least one parsed data tree for each code fragment, the at least one parsed data tree including a plurality of nodes, each node representing at least one part of speech of the plurality of parts of speech; wherein each node includes a location-aware code state indicative of a processing location of the at least one part of speech associated with each node; identifying, by at least one processor based at least in part on the enhanced parsing by the decision mechanism and the at least one parsed data tree for each node of each code fragment, a processing location for each part of speech; wherein the location-aware code state of each node includes a data structure defining the processing location; wherein the processing location represents: a client-side execution location including the client device, a server-side execution location including the server, or an agnostic execution location; determining, by at least one processor, based on the at least one parsed data tree, at least one software interface call between at least one first code segment and at least one second code segment; wherein the at least one first code segment includes at least one first part of speech being associated with at least one first node having the client-side execution location and the at least one second code segment includes at least one second part of speech being associated with at least one second node having the server-side execution location based at least in part on the location code states; determining, by at least one processor, based on the at least one first code segment and the at least one second code segment, data exchanged between the at least one first code segment and the at least one second code segment via the at least one software interface call; and inserting, by at least one processor, into the source code, the at least one software interface call configured to enable an exchange of the data.

In some aspects, the techniques described herein relate to a method, further including: receiving, by at least one processor, one or more communication selections via a graphical user interface, wherein the one or more communication selections of the at least one client application is at least one client diagram is representative of the client application, and wherein the one or more application selections of the at least one server application is at least one server diagram is representative of the server application.

In some aspects, the techniques described herein relate to a method, further including: generating, by at least one processor, one or more nodes by parsing the one or more application selections, wherein each node corresponds to at least one of: a server-specific syntax, a client-specific syntax, and a functionality of a plurality of functionalities associated with the application; and parsing, by at least one processor, the one or more nodes of to generate the computer-readable code.

In some aspects, the techniques described herein relate to a method, further including: identifying, in the plurality of code fragments, one or more internal method global variables including one or more types and one or more locations; and allocating the initial analysis state based on the one or more internal method global variables including the one or more types and the one or more locations.

BRIEF DESCRIPTION OF THE FIGURES

Some embodiments of the invention are herein described, by way of example only, with reference to the accompanying drawings. With specific reference now to the drawings in detail, it is stressed that the particulars shown are by way of example and for purposes of illustrative discussion of embodiments of the present disclosure. In this regard, the description taken with the drawings makes apparent to those skilled in the art how embodiments of the present disclosure may be practiced.

DETAILED DESCRIPTION

Figure 1:
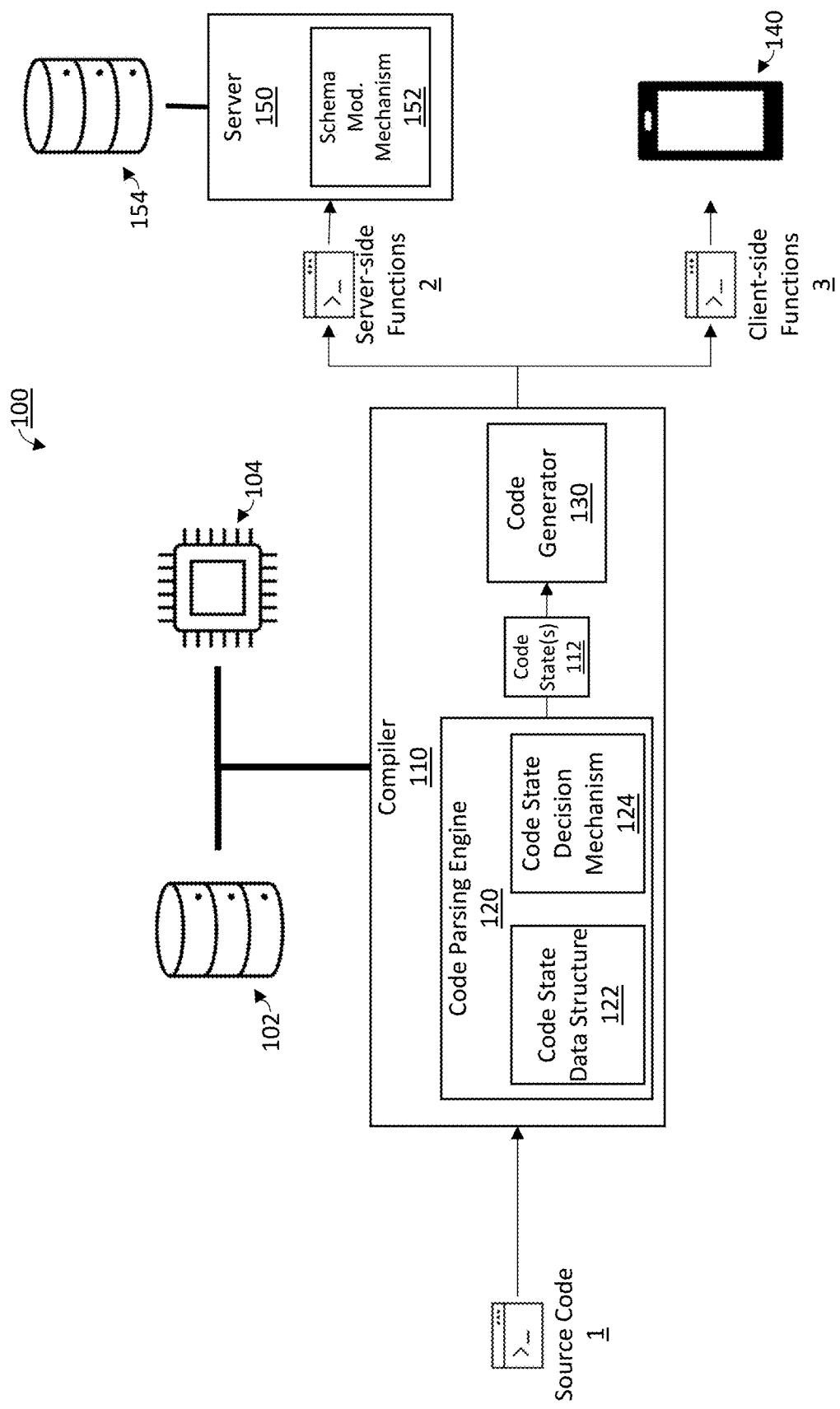
FIG. 1 depicts a block diagram of an illustrative full-stack development automation system 100 based on state-aware parsing of source code in accordance with one or more embodiments of the present disclosure.

Development of stateful mobile applications and ajax-style web-based applications can be complex, requiring "Full Stack" development, (e.g., coding of multiple layers of code in multiple languages and platforms with integration and communication between layers), requiring the use of skills and technologies in multiple categories including User Interface, Application Logic, Data Management, and Communication.

In some embodiments, application development can include design of a database structure (e.g., schema) for storage and manipulation of application data. In some embodiments, application development can include determination of operations that must be or would best be performed on the server due to library availability, data availability, portability, security, and performance considerations. In some embodiments, application development can include specification of an Application Programming Interface, (e.g., server calls, arguments, return values and formats) for communication between client code and server code. In some embodiments, application development can include coding and testing of server code and the APIs using a server-side language. In some embodiments, application development can include graphical User Interface design. In some embodiments, application development can include coding and testing of client-side graphical user interface (e.g., presentation layer) code in client side language(s) and/or UI framework(s). In some embodiments, application development can include coding and testing of application logic and behavior in a client-side language(s) (e.g., JavaScript). In some embodiments, application development can include integration of Graphical User Interface, client side application logic and server code using APIs. In some embodiments, application development can include testing and validation of complete code utilizing all components in combination.

Full-stack development can be complex, difficult and time consuming, due to the myriad of tasks necessary and the wide range of skill sets required. High complexity and difficulty can give rise to high cost and time of development, and difficulty in identifying programmers possessing the requisite range of skill sets and/or identifying and assembling, coordinating and managing multidisciplinary teams. The results typically exhibit an attendant lack of flexibility due to the difficulty of making changes in a complex integrated system whose fundamental assumptions are deeply imbedded.

Automating most, if not all, of the full-stack development process would be desirable so as to vastly simplify full-stack development, allowing developers to describe behavior of an application at a high level without regard to data schema, partitioning of code into client and server, or any of the necessary associated tasks involved in combining multiple platforms, layers and communication.

Whereas tools exist to aid in the full-stack development process, existing tools facilitate, rather than fully automate, full-stack development. They therefore still require a broad range of skill and knowledge sets, limiting their value. Full automation, wherein actual design of schemas, APIs and integrations is performed automatically without requiring human intervention or even awareness, would be of much greater value and utility, would enable low-cost development and rapid turn-around time for changes, including changes that modify deeply embedded assumptions (e.g., architecturally significant changes).

Various technological difficulties can arise from creating automated design solutions. In some embodiments, the difficulties include requirements to capture, or finding a way to capture the intent and meaning (e.g., requirements) of the application without incurring high knowledge requirement or human effort. In some embodiments, the difficulties include creation (Authorship), or the need to automatically determine a solution set (system design) that fulfills the requirements. In some embodiments, the difficulties include quality, or the need to incorporate non-explicit requirements such as security, good software design, performance etc. without human guidance or example.

To address these and other difficulties, the present disclosure provides numerous technical advantages and solutions. In some embodiments, the present disclosure can be used within programming tools to reduce workload and complexity of programming of multi-tier client-server applications (e.g., mobile apps). In some embodiments, the present disclosure can be used as a training tool to guide developers how to properly partition code.

For a client-server application (e.g., a mobile app) described using graphical diagrams, the present disclosure can automate the full-stack coding process by automatically determining what server calls should be made (e.g., API calls), automatically determine appropriate arguments and returns the correct values (e.g., full API), and generate code for both client and server including integration (e.g., placement of API calls within the generated code).

In some embodiments, the present disclosure includes expressing the resulting code, including back-end API calls, as source code expressed in a grammar or syntax. In some embodiments, the present disclosure includes expressing rules governing management of variables and movement of data between code segments as grammatical rules. In some embodiments, the present disclosure includes identifying a solution via enhanced parsing using a state-aware form of parser to identify a solution that conforms to the grammatical rules. In some embodiments, the present disclosure includes utilizing a run-time adaptive database schema modification mechanism to generate and incrementally improve the database schema at run-time.

Referring now to FIG. 1, a block diagram of an illustrative full-stack development automation system 100 based on state-aware enhanced parsing of source code is depicted in accordance with one or more embodiments of the present disclosure.

In some embodiments, a full-stack development automation system 100 may utilize a state-aware compiler 110 to compile source code 1 into server-side functions 2 and client-side functions 3, including injecting into the source code 1 automatically generated software interface calls between a server 150 and a client device 140 and/or one or more additional devices and/or systems. To do so, the compiler 110 may use a code parsing engine 120 to parse the source code 1 via enhanced parsing according to code state data structure 122 and code state decision mechanism(s) 124 to produce state-aware code state(s) 112 for each piece of code in the source code 1. A code generator 130 may use the code state(s) 112, which may include location sensitivity of each code fragment, and generate software interface calls according to one or more software interface call formats and the location sensitivity of each code fragment. As a result, the client-side functions 3 and/or the server-side functions 2 may be injected with the software interface calls to automatically deploy code that distributes functions across client-side and server-side functions.

In some embodiments, the full-stack development automation system 100 may include hardware components such as a processor 104, which may include local or remote processing components. In some embodiments, the processor 104 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 104 may include data-processing capacity provided by the microprocessor. In some embodiments, the microprocessor may include memory, processing, interface resources, controllers, and counters. In some embodiments, the microprocessor may also include one or more programs stored in memory.

Similarly, the full-stack development automation system 100 may include data store 102, such as one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the data store 102 may include, e.g., a suitable non-transient computer readable medium such as, e.g., random access memory (RAM), read only memory (ROM), one or more buffers and/or caches, among other memory devices or any combination thereof.

In some embodiments, the full-stack development automation system 100 may include a compiler 110 configured to enable automated full-stack development by implementing computer engines for enhanced code parsing to create code state(s) 112 that include flagging parts of speech of code fragments as server-side, client-side or location agnostic, and automated software interface call generation to automatically create software interface calls to create interoperability between the server-side, client-side or location agnostic parts of speech. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Herein, the term "code fragment" refers to pieces of code within source code associated with the performance of a particular function or portion of a software application, such as a routine, function, library, or other portion of the source code. An example of a code fragment may include an action block defining an action to be performed by the software application as per an exemplary visual programming tool (see, e.g., FIG. 7).

Herein, the term "part of speech" refers to a syntactic element within a code fragment as defined by one or more syntactic models and/or rules of a corresponding programming language. Examples of parts of speech may include, e.g., a reference, a variable reference, a variable identifier/name, statement, argument, definition, expression, among others or any combination thereof. The one or more syntactic models and/or rules may use linguistic features as well as other features of commonality beyond linguistic features, such as execution location as detailed further below to define parts of speech and/or types thereof.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the code parsing engine 120 may include dedicated and/or shared software components, hardware components, or a combination thereof. For example, the code parsing engine 120 may include a dedicated processor and storage. However, in some embodiments, the code parsing engine 120 may share hardware resources, including the processor 104 and data store 102 of the full-stack development automation system 100 via, e.g., a bus.

Similarly, in some embodiments, the code generator 130 may include dedicated and/or shared software components, hardware components, or a combination thereof. For example, the code generator 130 may include a dedicated processor and storage. However, in some embodiments, the code generator 130 may share hardware resources, including the processor 104 and data store 102 of the full-stack development automation system 100 via, e.g., the bus.

In some embodiments, the full-stack development automation system 100 may receive the source code 1. The source code 1 may include text-based code, visual programming code, object oriented code, high-level programming languages, mid-level programming languages, low-level programming languages, procedural programming languages, functional programming languages, scripting languages, logic programming languages, among others or any combination thereof. In some embodiments, the full-stack development automation system 100 may be a part of the user computing device 101.

In some embodiments, the source code 1 may be formed of code fragments and parts of speech. The code fragments may be segments in the source code 1 of text, action blocks of a visual programming language, compound functions, nested functions, natural language phrases, among other portions of the source code 1 that represent blocks of the code. The parts of speech may be portions of the code fragments the represent syntactic elements defined by syntactic rules of the programming language, such as, e.g., expressions, statements, variables, functions, or others or any combination thereof.

In some embodiments, the source code 1 may be expressed in any suitable programming language as detailed above. However, to facilitate efficient and accurate enhanced code parsing, the source code 1 may be expressed in a non-Turing complete programming language that does not allow for local variables. In such a language, the scope of all variables may be the entire code, including code defined in multiple different code fragments. The entire source code 1 may therefore be considered to have separate code blocks that may be invoked at any time, in any sequence, except insofar as that code blocks in simple chains may be combined to yield code block.

In some embodiments, to parse the source code 1 using enhanced parsing, the code parsing engine 120 of the compiler 110 may ingest the source code 1, and for each code fragment of the source code 1, analyze the parts of speech according to the syntax of the programming language. In some embodiments, the parts of speech may include code state decision mechanisms 124 that define actions to be performed in input data to produce output data.

In some embodiments, the code parsing engine 120 used to parse the programming language is designed to maintain a code state data structure 122 for the source code 1 and/or each code fragment, the code state data structure 122 having a code state for each code fragment, each code state(s) 112 having a value prior to the start of enhanced parsing. In some embodiments, the code state(s) 112 evolves during the process of enhanced parsing the source code 1 by updating the state at the successful conclusion of enhanced parsing of each code fragment (e.g., each syntactic element) to produce a new state for each code fragment. In some embodiments, the code parsing engine 120 may parse each code fragment to produce a respective code state 112 using assertions, which are implemented as methods of the code state object in the code state data structure 122. An example code state object for a particular code fragment is described in more detail in EXAMPLE 3 below.

In some embodiments, each part of speech having input data, output data and rules may form a node in a data tree. As the code parsing engine 120 traverses the source code 1 and identifies each code fragment based on the structure of the code such that each code fragment represents separate activities of the program embodied in the source code (e.g., a function, a code block for a particular functionality, a re-usable code block, etc.). The code parsing engine 120 may construct a parsed data tree for each code fragment to represent the structure and context of each code fragment. Each parsed data tree may include the source code location of each code fragment, such as a start line and end line or the code fragment, a unique identifier, a numerical index, or other identifier or any combination thereof. In some embodiments, the parsed data tree of all code fragments of the source code 1 may form the code state data structure 122. Each node of a parsed data tree may be a separate part of speech within the code fragment for which the parsed data tree applies.

In some embodiments, when the code parsing engine 120 generates a code state(s) 112 in the code state data structure 122 for a code fragment, the prior states (e.g., the code state(s) 112 for already parsed code fragments) are retained and associated with the start and end of each node in the parsed data tree, and the code state decision mechanism(s) 124 are associated with each syntactic part of speech governing how the state should be modified between start and end. In some embodiments, which assertions are made depends on the part of speech. Examples of part of speech dependent code state decision mechanism(s) are described in more detail in EXAMPLE 4 below.

In some embodiments, when enhanced parsing of a code fragment, the code parsing engine 120 may perform a two or more stage enhanced code parsing process. In some embodiments, a first enhanced parsing stage of the code parsing engine 120 may include parsing the code fragment to identify each part of speech and its associated type. In some embodiments, types of parts of speech may include, e.g., an expression, an argument or a variable, among others or any combination thereof. To do so, the code parsing engine 120 may apply the code state decision mechanism(s) 124 to segments of text within the code fragment, where the code state decision mechanism(s) 124 include syntactic rules associated with the programming language of the source code 1. By applying the syntactic rules to segments of text, segments matching a particular part of speech may be identified according to type. In some embodiments, the syntactic rules and/or type of the part of speech may also identify the input to the part of speech, the output to the part of speech and the rules for transforming input to the output. Thus, the syntactic rules may be applied to extract the input, output, type and rules of each part of speech. In doing so, the code parsing engine 120 may identify the start and end points within the code text of the identified part of speech. As a result, the code parsing engine 120 may generate a node within parsed data tree for a particular code fragment, wherein the node catalogs the input, output, type, rules, and start and end locations in the code of the part of speech. The code parsing engine 120 may then shift locations to identify a next part of speech using the syntactic rules in order to generate a next node branching from the node of the previous part of speech. This stage of the enhanced parsing process is continued until the end of the code fragment is reached, thus completing the parsed data tree for the code fragment.

In some embodiments, in a second stage of the code parsing process, the code parsing engine 120 may re-parse the code of the code fragment based on location-specific decision mechanism(s) of the code state decision mechanism(s) 124. Using the location-specific decision mechanism(s), each part of speech, and thus each node in the parsed data tree, may be tested to determine the presence of client-specific, server-specific, location agnostic, or unknown location syntax, and thus an execution location for the part of speech. In some embodiments, the execution location may include one or more of, e.g., client-side execution, server-side execution, database execution (e.g., for a database query), cloud execution, service or microservice execution, among others or any combination thereof. In some embodiments, within "client-side execution," the location-specific decision mechanism(s) may identify one or more different client devices on which the part of speech may be executed, such as, e.g., one or more computing devices in a distributed computing environment. Similarly, in some embodiments, within "server-side execution," the location-specific decision mechanism(s) may identify one or more different server devices on which the part of speech may be executed, such as, e.g., one or more servers in a distributed computing environment and/or server system or server farm. Location-specific decision mechanism(s) such as location-specific rules, location-specific AI/ML models, among others or any combination thereof are detailed further below with respect to client-side or server-side execution locations, though the location-specific decision mechanism(s) may be extended to specify multiple different client and/or server locations. As a result, the code parsing engine 120 may modify each node within parsed data tree for a particular code fragment to define the location-specific execution of each part of speech of the particular code fragment. Therefore, the enhanced parsing process parses the code based on more than syntactic elements, but also other factors of commonality, such execution or processing location, among others or any combination thereof, to enhance the parsing of the code by the compiler 110.

In some embodiments, the code parsing engine 120 may employ the code state decision mechanism 124 to determine the location-specific execution of each node and/or part of speech of each code fragment based on attributes of each node such as the input, output, syntactic type, configurations for each syntactic type, execution location decisioning rules and/or one or more machine learning (ML) and/or artificial intelligence (AI) models, or any combination thereof. In some embodiments, for example, the code state decision mechanism 124 may be configured to utilize one or more exemplary AI/machine learning techniques chosen from, but not limited to, large language models (LLM), generative AI (e.g., generative model(s), transformer(s), etc.), decision trees, boosting, support-vector machines, neural networks, nearest neighbor algorithms, Naive Bayes, bagging, random forests, Bayesian modelling, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i. define Neural Network architecture/model,
ii. transfer the input data to the exemplary neural network model,
iii. train the exemplary model incrementally,
iv. determine the accuracy for a specific number of timesteps,
v. apply the exemplary trained model to process the newly-received input data,
vi. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the parameters of the aggregation functions, activation functions, architecture structure, among other parameters and/or hyperparameters of the AI/ML technique, may be trained based on a training dataset including historical source code examples having known location-specific execution parts of speech. In some embodiments, the training dataset may be provided to the AI/ML model(s), e.g., encoded in a feature vector, to produce a prediction. In some embodiments, an optimizer associated with the AI/ML models may then compare the prediction with the known location-specific execution of a training dataset to determine an error of the predicted label. In some embodiments, the optimizer may employ a loss function, such as, e.g., Hinge Loss, Multi-class SVM Loss, Cross Entropy Loss, Negative Log Likelihood, or other suitable classification loss function to determine the error of the predicted label based on the known output.

In some embodiments, upon enhanced parsing of all code fragments to complete all nodes in the logical tree structure, the code parsing engine 120 may produce the code state data structure 122 having a chain of code states 112, each of which is associated with a character position in the source code 1, representing the compiler's 110 understanding of contextual information taking into account the initial code state and all source code to the left of the character position.

In some embodiments, to implement a self-analysis mechanism whereby the code parsing engine 120, at the conclusion of enhanced parsing of each code fragment, re-parses the chunk of source code associated with each code fragment separately, using the parsed data tree of each code fragment as an initial analysis state. Upon re-parsing the source code 1, the code parsing engine 120 may make modifications to one or more parsed data trees and/or nodes thereof based on the locations, types and/or location-specific execution of each part of speech to produce a final code state 112 for each code fragment. In some embodiments, the code parsing engine 120 may store the final code state 112 obtained thereby with the code fragment. In some embodiments, the self-analysis may improve the code parsing engine 120 because assumptions made in one part of the code may end up changing the structure of other parts. Thus, feeding back the output and repeating the process becomes a form of constraint propagation. In some embodiments, the code parsing engine 120 may implement one or more other constraint propagation techniques or any combination thereof.

In some embodiments, as a result, the code parsing engine 120 produces code state(s) 112 for each part of speech node in the resultant parsed data tree. Each node in the resultant parsed data tree may include three code states, (1) one corresponding to the compiler's 110 understanding as of the character position just before (to the left) of the part of speech (the "start state"), (2) one for the end, e.g., as of after parsing the last character of the part of speech (the "end state"), and (3) one corresponding to the state we would have achieved if the part of speech were parsed in isolation (the "self-analysis" state).

Exemplary Location Awareness

In some embodiments, the code states 112 may include two data items, the "current location" and an associative array, that describe location information of the code fragment within the source code 1. EXAMPLE 3 provides an example with illustrative location information.

In some embodiments, the code parsing engine 120 may be configured to assume that the final application will have of client-side code that will potentially, at various points invoke server-side routines via one or more software interface calls, such as, e.g., web-service style API calls, remote procedure calls (RPC), database queries, etc., then wait for a response (if values are being passed back) before continuing. Server-side code for the associated software interface call may begin executing upon receiving the call, execute, return a response if any is required, save out any data that should be retained (if any), then stop.

In some embodiments, some parts of speech, such as statements, including higher-level code fragments that involve multiple sub-statements are assumed to either (1) start, run and conclude completely on the server or (2) start and conclude on the client, but may or may not involve sub-statements that invoke server-side software interface calls as part of their function. In some embodiments, the current location in the code state 112 indicates whether, for a particular point in the code, the code at that point is assumed to have client-specific syntax indicating execution to be on the client. Similarly, the current location in the code state 112 indicates whether, for a particular point in the code, the code at that point is assumed to have server-specific syntax indicating execution to be on the server. In some embodiments, the current location in the code state 112 indicates whether, for a particular point in the code, the code at that point is assumed to have neither client-specific syntax nor server-specific syntax indicating that the location is indeterminate (meaning that no specific location has yet been determined or specified).

In some embodiments, parts of speech, e.g., statements, that start, run and conclude completely on the server may mark with "server" the current location values for all code states within an associated sub-tree of the parsed data tree, whereas those that start and conclude on the client may have current location values as the start and end state equal to "client" but may have differing values for intermediate code states between the start and the end.

In some embodiments, the code state(s) 112 may also track variable locations for the source code 1. In some embodiments, the associative array for a variable may describe a location value for every unique variable used in the application that has a location assigned to it. In which case, an associative array for a particular variable may have a value of "client" or "server".

In some embodiments, when the value of a variable's associative array is set to "client", it means that the variable's data is resident on the client side and not necessarily on the server. It may be copied (passed) to the server temporarily as a read-only copy but may only be modified on the client by code running on the client. Similarly, in some embodiments, when the value of variable's associative array is set to "server", it means that the variable's data is resident on the server side and not necessarily on the client. It may be copied (passed) to the client as a read-only copy but may only be modified on the server by code running on the server.

Accordingly, in some embodiments, the code parsing engine 120 may enhanced parse, based on the parsed data tree, code fragments to identify a processing location for each part of speech of the code fragments. The location code states may include data structures defining, for the parts of speech, the processing location that represents whether each part of speech is configured (e.g., based on a configuration file stored in the data store 102) for a client-side execution location representing client-side execution on the client device 140, a server-side execution location representing server-side execution on the server 150, or an agnostic execution location representing execution on either the client device 140 or the server 150.

In some embodiments, upon the code parsing engine 120 successfully parsing the source code 1, the code fragments may be successfully parsed with or without the location sensitive parts of speech included. However, if the location sensitive parts of speech are included, the resultant parsed data tree may include information that can be used to identify a valid set of functions calls from client to server and/or vice versa. Enhanced parsing without location aware parts of speech may therefore be used to determine code validity, followed by parsing with location sensitive parts of speech included in order to extract the definition of a valid corresponding set of server-side routines and to construct functions calls to them.

In some embodiments, when the code parsing engine 120 parses, using all parts of speech including location sensitive parts of speech, the nodes in one or more of the parsed data trees of the code state data structure 122 designating a server-side-section of code that are not contained within another server-side section, each may be associated with a server-side software interface call. In some embodiments, once the code parsing engine 120 parses and identifies all calls, the code parsing engine 120 may identify the variable to be passed to, or returned from, the calls, and store such calls within an argument analysis structure, which is used to generate the code for the software interface calls. Illustrative examples of the code generation procedure and the argument analysis process are described in more detail in EXAMPLE 5 and EXAMPLE 6, respectively.

Accordingly, in some embodiments, the code generator 130 may determine, based on the location code states, at least one software interface call between at least one client-side code section having one or more parts of speech designated for client-side execution and at least one server-side code section having one or more parts of speech designated for server-side execution, where the at least one client-side code section comprises the client-side execution location and the at least one server-side code section comprises the server-side execution location based at least in part on the location code states. In some embodiments, based on the at least one client-side code section and the at least one server-side code section, the code generator 130 may determine the data exchanged between the at least one client-side code section and the at least one server-side code sections and the respective parts of speech thereof via the at least one software interface call.

In some embodiments, the code generator 130 may be configured (e.g., via the configuration file in the data store 102) to prioritize client-side execution, server-side execution or neither for the source code 1 and/or each code fragment and/or each part of speech. Thus, the code generator 130 may generator code based on the locations and/or associative arrays in the code state(s) 112 of each code fragment, preferencing generating server-side or client-side code when possible. As a result, the code generation process is designed to place variables on the client side, or copy server-side variables to the client, only when necessary or specifically directed.

For example, the code generator 130 may be configured according to the design assumption that the data on the client side is inherently insecure, since it will be located on the user's client device 140 and potentially accessible by the user, whereas data residing on the server 150 may be either hidden from the user completely or made read-only, and thus may be more secure. Accordingly, the code generator 130 may be configured to preference locating parts of speech and/or code fragments in the server 150.

In some embodiments, based on the argument analysis, the code generator 130 may define a format for the software interface call based on the variables to be passed and the server-side and/or client-side routines. The defined format, as illustrated by EXAMPLE 6 below, may be used to generate code for the software interface call that causes the client device 140 to perform the client-side routine(s), issue a software interface call to the server to trigger the server 150 to perform the server-side routine(s) and receive data returned by the server 150.

In some embodiments, the full-stack development automation system 100 may utilize a run-time adaptive database access modification mechanism 152, e.g., at the server 150, to generate and incrementally improve, at run-time, a database schema of a database 154 and/or business logic based on logs related to interactions with the database 154.

In some embodiments, the run-time adaptive database access modification mechanism 152 may implement an interface to the database 154 that, in lazy fashion (meaning when first encountered) when any database operation is requested, first examines the structure of the database 154 to determine (1) what are the tables of the database 154, and their names, (2) what are the columns of the tables, the column names, and data types, and (3) which columns represent "indexed" columns that may be used to perform searches or complex queries. The structure is stored in memory.

In some embodiments, upon the invocation of any statement in the code requiring access to a database stored object, code is invoked at run time to (1) map the name of the object class to a corresponding table using a naming convention (2) map the value being read or written to a column of the associated table using a naming convention (3) compare the type of data being passed, to the in-memory record of the type of the data in the database column. These former three associations may be cached, such that repeated accesses to the same set of combinations yields the same results.

In some embodiments, the run-time adaptive database access modification mechanism 152 may utilize one or more programmatic and/or machine learning based mechanisms to learn changes to the schema. Where machine learning based mechanisms are employed, the run-time adaptive database access modification mechanism 152 may form training datasets from database access logs and/or database query logs, error logs, among other database and server interaction histories or any combination thereof. Based on the training datasets, the run-time adaptive database access modification mechanism 152 may be trained to generate a new or adapted schema for the database 154 based on the interactions with the database 152. Thus, by making use of run-time data, the run-time adaptive database access modification mechanism 152 may provide AI-based systems integration through adaptive learning of database schemas and/or business logic that may be learned and/or adapted at run-time. In some embodiments, the adaptation to the schema and/or business logic may be optimized for performance, scalability, compatibility, or any other performance objective or any combination thereof based performance metrics of the logs.

In some embodiments, a lookup may then be made to a set of rules determining if the column can store the data in question. In some embodiments, the set of rules may be fixed, learned (e.g., via one or more AI and/or ML-based techniques), or configurable, or any combination thereof. If so, processing continues normally, and the operation is translated to a database SELECT or UPDATE operation. If on the other hand the formats are incompatible, the same rule set is used to derive a "mutually compatible" data type capable of storing both existing data in the table and the new data being requested. The access modification mechanism 152 may then dynamically reformat the column and/or modify the schema to accommodate the new data by adding tables and/or columns, and re-formatting column types as necessary. An example of pseudo-code for reformatting the column and/or modifying the schema:

```
// this is called prior to a write to see if a column can accept the type being
// written to it. $dst_type is the mysql type of the column
// src_type is the mysql type of the value being written
private function mysql_types_are_compatible($dst_mtype,$src_mtype) {
   // if equal, then ok
   if ($dst_mtype == $src_mtype) return true;
   // if not...
   switch($dst_mtype) {
      case 'longtext':
         return true;                 // longtext can pretty much store anything
      case 'double':
         // double can store any numeric type
         return in_array($src_mtype,array('bigint(20)','int(15)','tinyint(4)'));
      case 'bigint(20)':
         // a bigint can store a smaller int
         return in_array($src_mtype,array('int(15)','tinyint(4)'));
      case 'int(15)':
         // an int can store a smaller int
         return in_array($src_mtype,array('tinyint(4)'));
      case 'tinyint(4)':
         // a bool can only store itself
         return false;
      case 'varchar(250)':
         // a varchar(250) can store any numeric type, but not a longtext
         return in_array($src_mtype,array('double','bigint(20)','int(15)','tinyint(4)'));
      default:
         return false;
   }
}
// assuming $newtype is a myswl type that is not compatible with the current type
// of a table column (e.g. pushing a longtext into a varchar(250) for example,
// or a double into an integer.. this will attempt to change the schema to make the table
// column wider or more general purpose in order to accommodate the new type.
// if successful, it returns true else false
private function alter_column_type($tablename, $column, $existingtype, $newtype) {
   static $attempted = array( ); // [table][column]=>flag
   // if we already tried, return what was found before
   if (isset($attempted[$tablename][$column])) return $attempted[$tablename][$column];
   // never tried before, so go for it
   // first, flush the query cache so pdo gets reset
   $this->reset_query_cache( );
   // now try the change
   $pdo = $this->get_pdo( );
   $autoinc = $this->tableData[$tablename][$column]['autoinc'];
   $sth = $this->pdo->prepare( $sql =
      "ALTER TABLE `$tablename` CHANGE `$column` `$column` $newtype ".($autoinc ? "NOT NULL AUTO_INCREMENT" : "NULL DEFAULT NULL")
   );
   $result = $attempted[$tablename][$column] = $sth->execute(array( )) && true;
   // if it worked, refresh the table data
   if ($result) {
      $this->refresh_tabledata( );
   }
   // and return the resuls
   return $result;
   // handle the varchar(250) to longtext case
// if (($existingtype == "varchar(250)") && ($newtype == "longtext")) {
}
```

In some embodiments, the access modification mechanism 152 may implement a similar technique for operations requiring indexing e.g., lookups based on data values. A check is made as to whether the associated column is an index and, if not, is indexed on the fly.

In some embodiments, the net effect of this dynamic access modification is that database schemas and/or business logic for the database 154 need not be determined or design in advanced, but instead naturally evolve incrementally during testing an operation of the code. In some embodiments, not all portions and/or features of an application may be available initially, but that the application may starts out with a minimal subset of functionality and evolved, through successive versions to a more complex and complete version. By dynamically modifying the database schema and/or business logic, the access modification mechanism 152 may automatically maintain data compatibility with older versions of the application code, while evolving additional the schema incrementally to accommodate new code as necessary.

Similarly, in some embodiments, a single database 154 may be called upon to serve the data needs of multiple applications accessing it. For example, in the case of one application that presents itself for the use of end users, and another for purposes of administration. In such cases, the various applications sharing the same common database 154 may be unlikely to evolve in lockstep: one may become available prior to the others, and they may evolve capabilities independently and at different times. The run-time adaptive access mechanism 152 may allow multiple applications to access the same database 154 end evolve separately without all having to be known or designed in advance.

In some embodiments, once all applications and versions of applications have been tested and run, the database 154 may be "locked down" e.g., changes to the schema disabled, for security purposes, and re-enabled later if necessary to accommodate further follow-on development. Accordingly, in some embodiments, the database 154 may be toggled between an "adaptation" model and a "locked down" mode to enable a user to switch the database 154 into a mode whereby the database 154 schema is adapted using the run-time adaptive access mechanism 152, and then for deployment, switch to the locked down mode to fix the schema.

Figure 2:
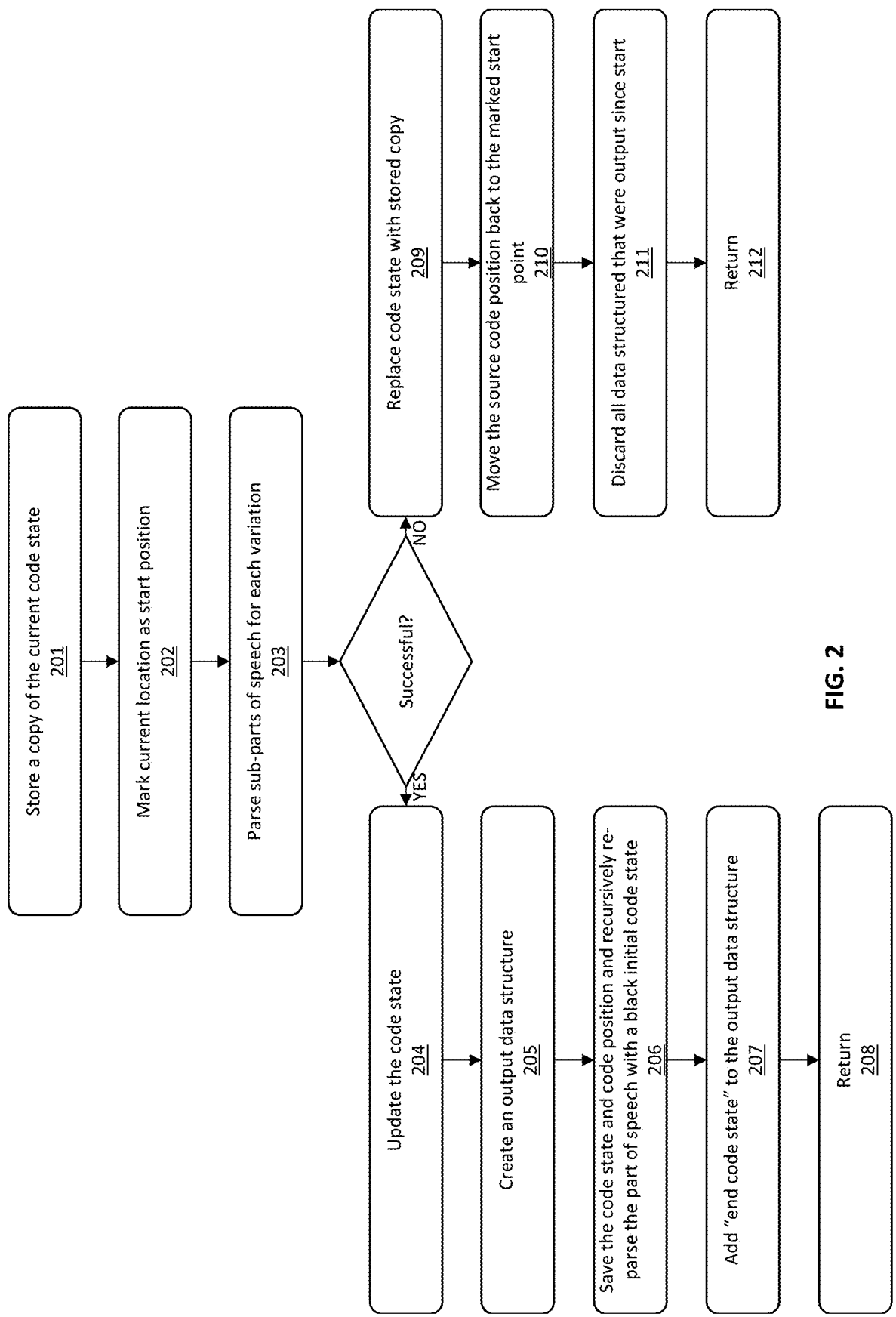
FIG. 2 illustrates a flowchart illustrating an exemplary parsing algorithm of the code parsing engine 120 in accordance with one or more embodiments of the present disclosure.

Referring now to FIG. 2, a flowchart illustrating an exemplary parsing algorithm of the code parsing engine 120 is depicted in accordance with one or more embodiments of the present disclosure.

In some embodiments, the code parsing engine 120 may parse the source code 1 by identifying a piece of the source code 1 to be parsed, and a part of speech to which it is expected to conform, such as an expression or a code fragment. In some embodiments, the parsing algorithm can perform the following steps:

At step 201, the code parsing engine 120 may store a copy of the current code state.

At step 202, the code parsing engine 120 may mark the current location in the source code 1 as the start position.

At step 203, the code parsing engine 120 may parse all sub-parts of speech for each variation.

In some embodiments, the parsing may not be successful for one or more code fragments. Where parsing is not successful, at step 209, the code parsing engine 120 may replace the code state with the stored copy. At step 210, the code parsing engine 120 may move the source code position back to the marked start point. At step 211, the code parsing engine 120 may discard all data structured that were output since the start; and if there are any more variations to try, the code parsing engine 120 move on to the next one and continue.

Otherwise, at step 212, the code parsing engine 120 may return false.

In some embodiments, where all code fragments are parsed successfully, the code parsing engine 120, at step 204, may update the code state by making all *assertions* associated with a current part of speech.

At step 205, the code parsing engine 120 may create an output code state data structure 122 with: what part of speech was identified. the (e.g., saved) code state as of the start. the current code state (e.g., state as of the end). the start source code 1 position. the current (e.g., end) code position, and the text between start and end code positions (e.g., the text of the part of speech).

At step 206, the code parsing engine 120 may save the code state and code position so that as to not be affected, The code parsing engine 120 may then recursively re-parse the text of the part of speech, using a blank initial code state, and restore the code state and code position afterward.

At step 207, the code parsing engine 120 may add the "end code state" portion of the resultant data structure to the output data structure, calling it the "self analysis."

At step 208, the code parsing engine 120 may return the data structure.

Figure 3:
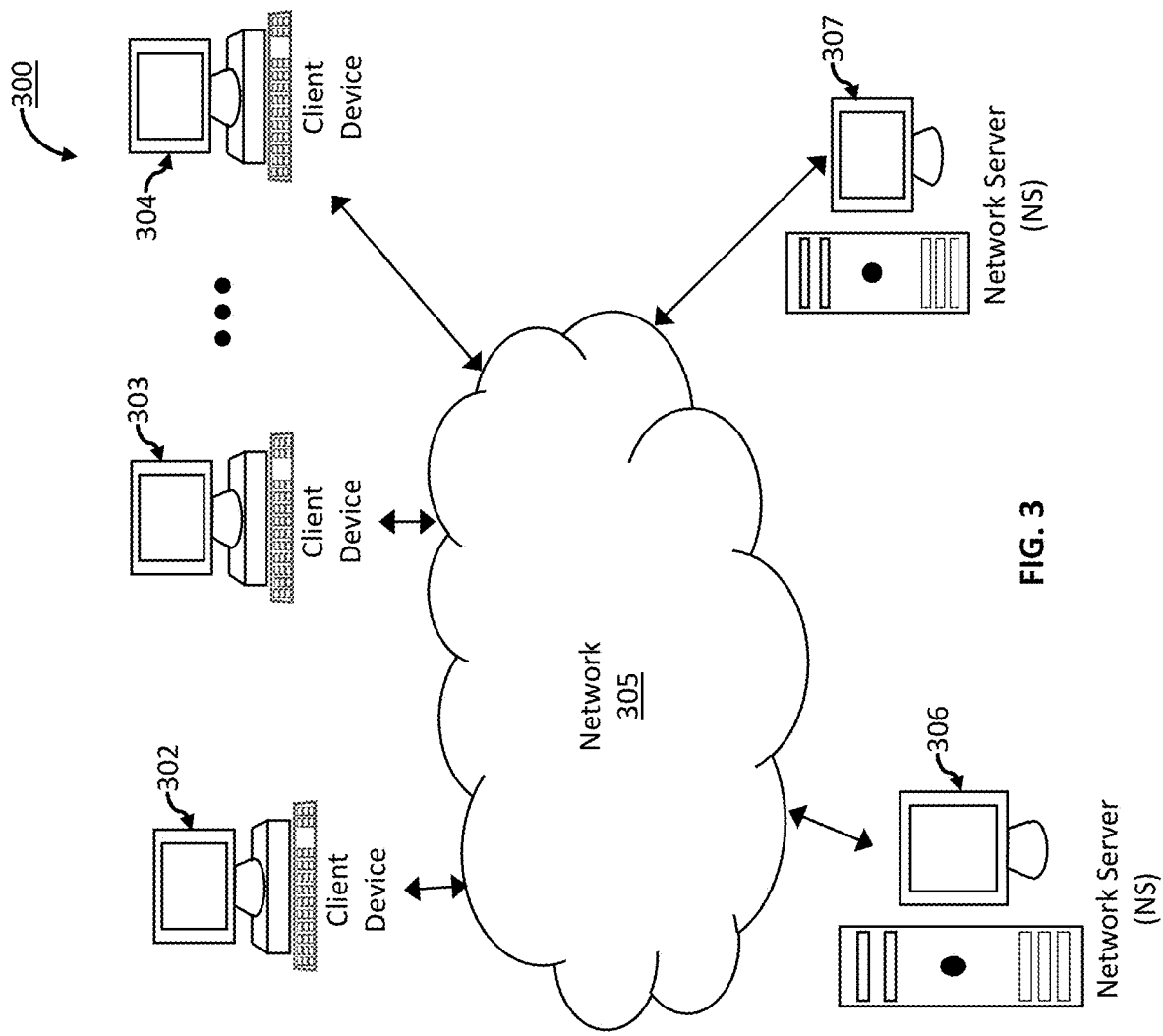
FIG. 3 depicts a block diagram of an exemplary computer-based system and platform for the full-stack development automation system 100 in accordance with one or more embodiments of the present disclosure.

FIG. 3 depicts a block diagram of an exemplary computer-based system and platform for full-stack development automation system 100 in accordance with one or more embodiments of the present disclosure.

FIG. 3 depicts a block diagram of an exemplary computer-based system and platform 300 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 300 may be configured to manage a large number of members and concurrent transactions, as detailed herein. In some embodiments, the exemplary computer-based system and platform 300 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 3, client device 302, client device 303 through client device 304 (e.g., clients) of the exemplary computer-based system and platform 300 may include virtually any computing device capable of receiving and sending a message over a network (e.g., cloud network), such as network 305, to and from another computing device, such as servers 306 and 307, each other, and the like. In some embodiments, the client devices 302 through 304 may be personal computers, multiprocessor systems, microprocessor-based or programmable consumer electronics, network PCs, and the like. In some embodiments, one or more client devices within client devices 302 through 304 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more client devices within client devices 302 through 304 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more client devices within client devices 302 through 304 may include may run one or more applications, such as Internet browsers, mobile applications, voice calls, video games, videoconferencing, and email, among others. In some embodiments, one or more client devices within client devices 302 through 304 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within client devices 302 through 304 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which is remotely downloadable by the user using network protocols such as FTP, SSH, or other file transfer mechanisms. In some embodiments, a client device may provide several levels of user interface, for example, advance user, standard user. In some embodiments, one or more client devices within client devices 302 through 304 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 305 may provide network access, data transport and/or other services to any computing device coupled to it. In some embodiments, the exemplary network 305 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 305 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 305 may include and implement, as an alternative or in conjunction with one or more of the above, a WiMAX architecture defined by the WiMAX forum. In some embodiments and, optionally, in combination of any embodiment described above or below, the exemplary network 305 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 305 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 305 may also include mass storage, such as network attached storage (NAS), a storage area network (SAN), a content delivery network (CDN) or other forms of computer or machine readable media.

In some embodiments, the exemplary server 306 or the exemplary server 307 may be a web server (or a series of servers) running a network operating system, examples of which may include but are not limited to Apache on Linux or Microsoft IIS (Internet Information Services). In some embodiments, the exemplary server 306 or the exemplary server 307 may be used for and/or provide cloud and/or network computing. Although not shown in FIG. 3, in some embodiments, the exemplary server 306 or the exemplary server 307 may have connections to external systems like email, SMS messaging, text messaging, ad content providers, etc. Any of the features of the exemplary server 306 may be also implemented in the exemplary server 307 and vice versa.

In some embodiments, one or more of the exemplary servers 306 and 307 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the client devices 301 through 304.

In some embodiments and, optionally, in combination of any embodiment described above or below, for example, one or more exemplary computing client devices 302 through 304, the exemplary server 306, and/or the exemplary server 307 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 4:
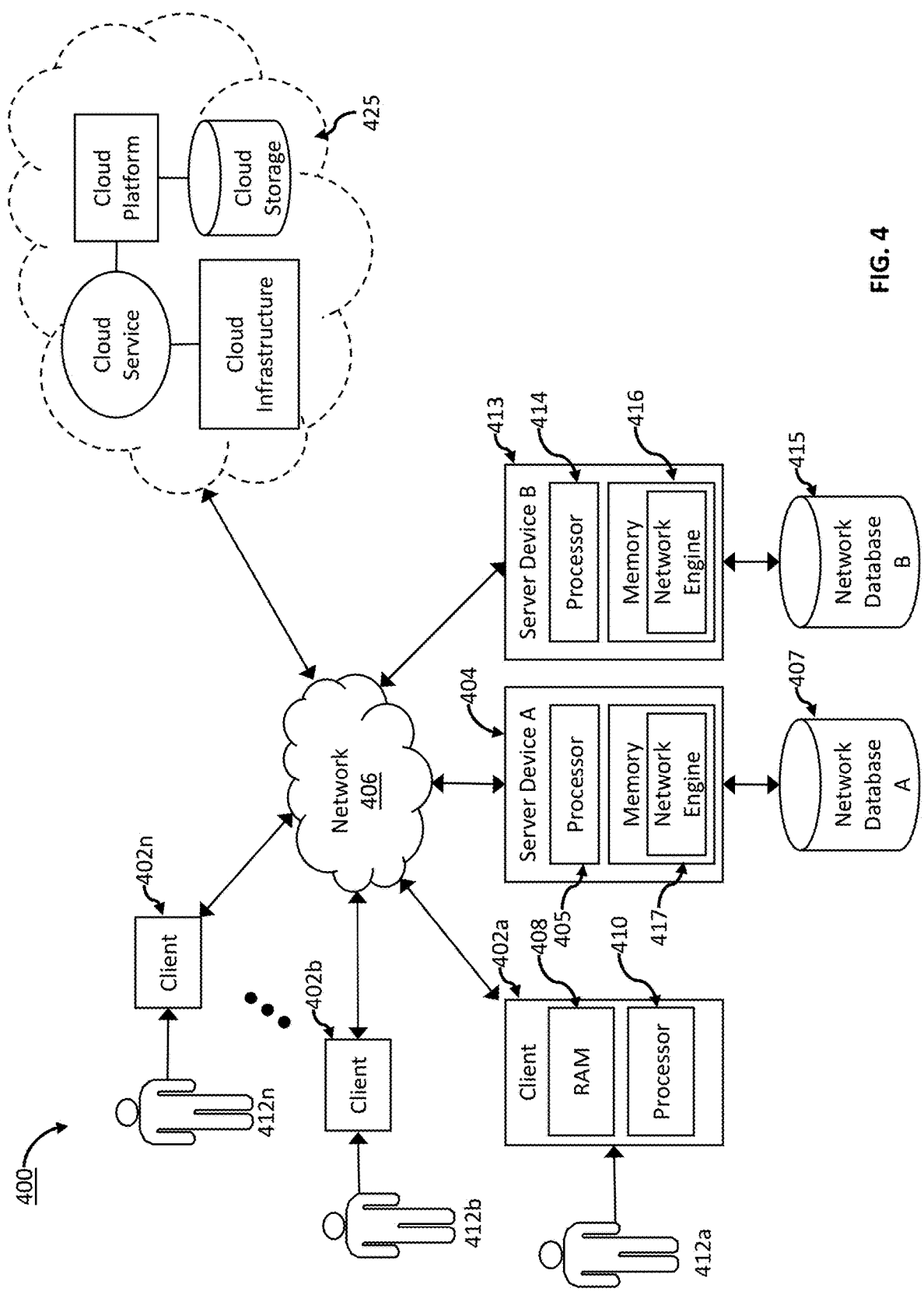
FIG. 4 depicts a block diagram of another exemplary computer-based system and platform for the full-stack development automation system 100 in accordance with one or more embodiments of the present disclosure.

FIG. 4 depicts a block diagram of another exemplary computer-based system and platform for full-stack development automation system 100 in accordance with one or more embodiments of the present disclosure.

FIG. 4 depicts a block diagram of another exemplary computer-based system and platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the client devices 402a, 402b through 402n shown each at least includes a computer-readable medium, such as a random-access memory (RAM) 408 coupled to a processor 410 or FLASH memory. In some embodiments, the processor 410 may execute computer-executable program instructions stored in memory 408. In some embodiments, the processor 410 may include a microprocessor, an ASIC, and/or a state machine. In some embodiments, the processor 410 may include, or may be in communication with, media, for example computer-readable media, which stores instructions that, when executed by the processor 410, may cause the processor 410 to perform one or more steps described herein. In some embodiments, examples of computer-readable media may include, but are not limited to, an electronic, optical, magnetic, or other storage or transmission device capable of providing a processor, such as the processor 410 of client device 402a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, client devices 402*a* through 402*n* may also comprise a number of external or internal devices such as a mouse, a CD-ROM, DVD, a physical or virtual keyboard, a display, or other input or output devices. In some embodiments, examples of client devices 402*a* through 402*n* (e.g., clients) may be any type of processor-based platforms that are connected to a network 406 such as, without limitation, personal computers, digital assistants, personal digital assistants, smart phones, pagers, digital tablets, laptop computers, Internet appliances, and other processor-based devices. In some embodiments, client devices 402*a* through 402*n* may be specifically programmed with one or more application programs in accordance with one or more principles/methodologies detailed herein. In some embodiments, client devices 402*a* through 402*n* may operate on any operating system capable of supporting a browser or browser-enabled application, such as Microsoft™, Windows™, and/or Linux. In some embodiments, client devices 402*a* through 402*n* shown may include, for example, personal computers executing a browser application program such as Microsoft Corporation's Internet Explorer™, Apple Computer, Inc.'s Safari™, Mozilla Firefox, and/or Opera.

In some embodiments, through the member computing client devices 402*a* through 402*n*, users, 412*a* through 402*n*, may communicate over the exemplary network 406 with each other and/or with other systems and/or devices coupled to the network 406. As shown in FIG. 4, exemplary server devices 404 and 413 may include processor 405 and processor 414, respectively, as well as memory 417 and memory 416, respectively. In some embodiments, the server devices 404 and 413 may be also coupled to the network 406. In some embodiments, one or more client devices 402*a* through 402*n* may be mobile clients.

In some embodiments, at least one database of exemplary databases 407 and 415 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 5:
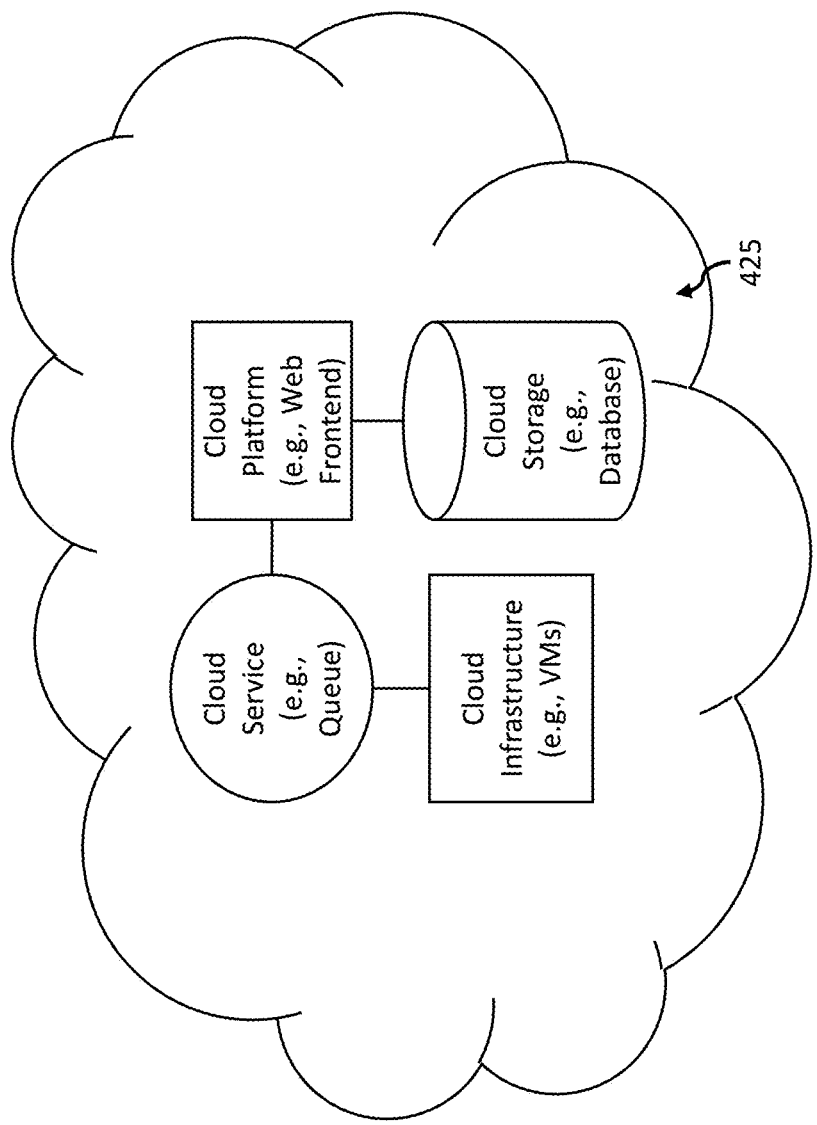
FIG. 5 depicts illustrative schematics of an exemplary implementation of the cloud computing/architecture(s) in which embodiments of a system for the full-stack development automation system 100 may be specifically configured to operate in accordance with some embodiments of the present disclosure.

FIG. 5 depicts illustrative schematics of an exemplary implementation of the cloud computing/architecture(s) in which embodiments of a system for the full-stack development automation system 100 may be specifically configured to operate in accordance with some embodiments of the present disclosure.

Figure 6:
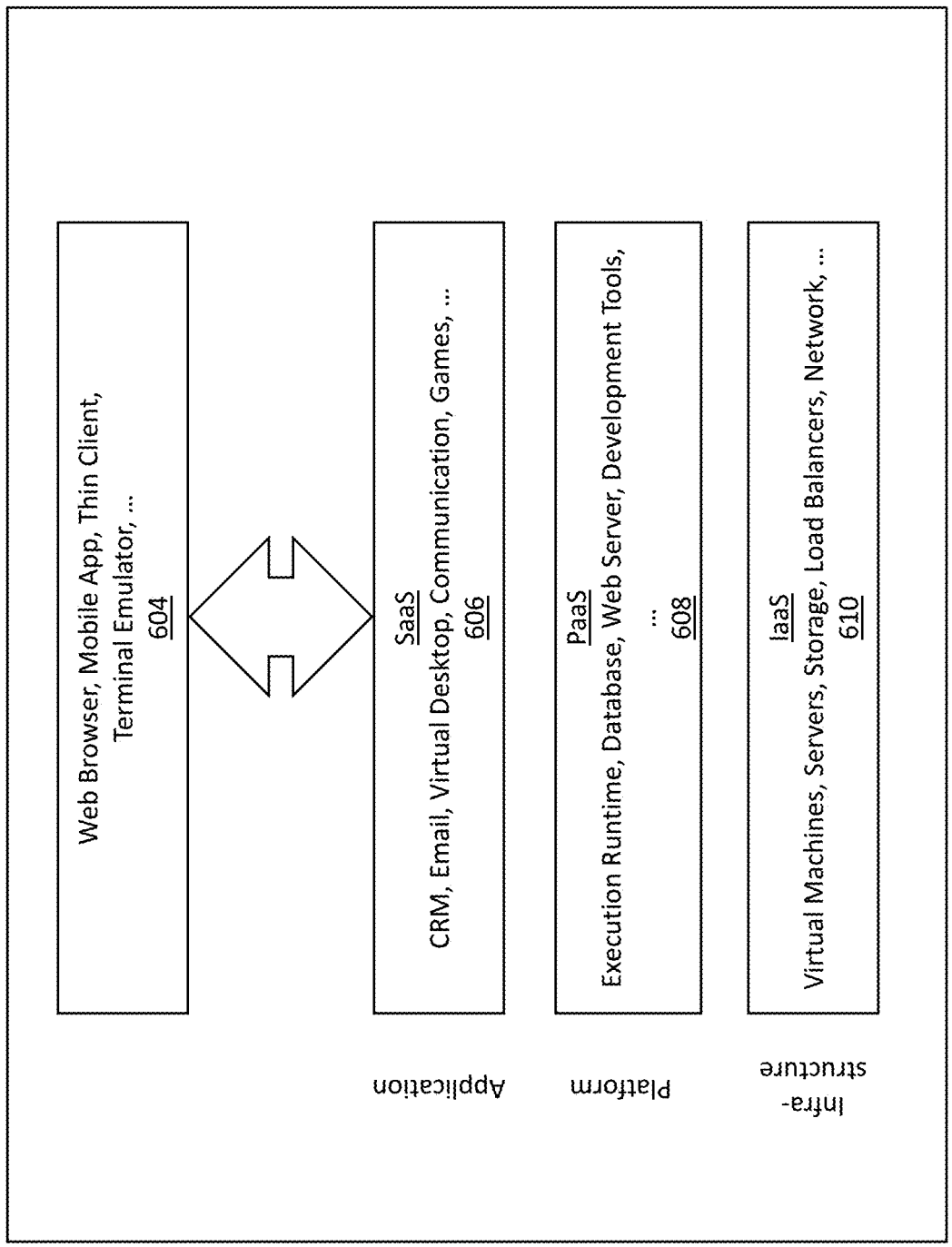
FIG. 6 depicts illustrative schematics of another exemplary implementation of the cloud computing/architecture(s) in which embodiments of a system for the full-stack development automation system 100 may be specifically configured to operate in accordance with some embodiments of the present disclosure.

FIG. 6 depicts illustrative schematics of another exemplary implementation of the cloud computing/architecture(s) in which embodiments of a system for the full-stack development automation system 100 may be specifically configured to operate in accordance with some embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 425 such as, but not limiting to: infrastructure a service (IaaS) 610, platform as a service (PaaS) 608, and/or software as a service (SaaS) 606 using a web browser, mobile app, thin client, terminal emulator or other endpoint 604. FIGS. 5 and 6 illustrate schematics of exemplary implementations of the cloud computing/architecture(s) in which the exemplary systems of the present disclosure may be specifically configured to operate.

Figure 7:
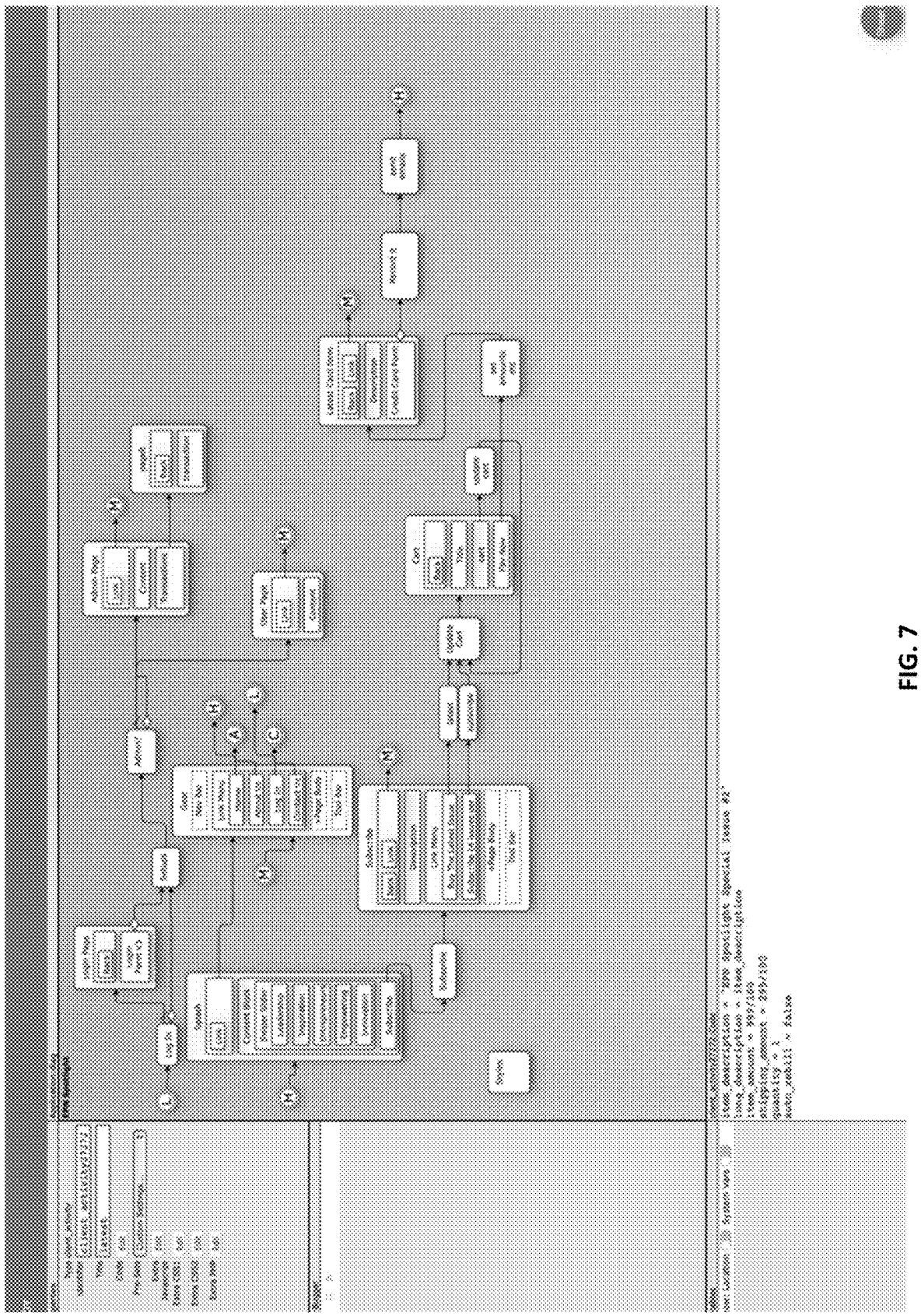
FIG. 7 shows an example graphical IDE (Integrated Development Environment) in accordance with some embodiments of the present disclosure.

Example 1—Illustrative Graphical IDE and Non-Turing Complete Programming Language In some embodiments, the present disclosure, as shown in FIG. 7, can include a graphical IDE (Integrated Development Environment) with GUI (graphical user interface) elements. The present disclosure can employ a graphical IDE designed for development of mobile, desktop, web or other applications, wherein a user expresses the design of the application as a set of user interface elements (e.g. pages, popups, panels, tabs etc. tables, buttons, forms) represented as named blocks on a design sheet (See FIG. 7) and actions to be performed also as blocks on the design sheet with arrows placed between elements and between elements and action blocks representing graphical transitions and/or invocation of code in response to user activity. In some embodiments, arrows may be marked with symbols indicating that transition or execution. The markings can be contingent upon evaluation of a code expression to true.

In some embodiments, the present disclosure can include action blocks and illustrative programming language. The designer associates code with action blocks by selecting action blocks and then expressing the associated code in a simple non-Turing complete programming language with a simple syntax (see for example, EXAMPLE 2: illustrative programming language syntax) and typing it in. In some embodiments, this language can be the illustrative programming language.

In some embodiments, there may be specific characteristics of the illustrative programming language that can make possible the automated AI determination generation and integration as described herein. For example: (a) avoid a Turing-Complete language. Such languages enable the duplication of functionality for any arbitrary language in terms of the statements of the primary language. By not providing a Turing-complete language, the user can be forced to describe the activities the application should perform in each case, rather than in terms of subroutines or function definitions and calls to them. In other words, can seek to specifically disable "re-use" of code except insofar as describing multiple visual links between activities in the graphical IDE. Re-use of code may only be allowed via the use of macro processing, e.g., expansion of statements and expressions at compile time. The code therefore may include explicitly described operations for each action to be performed. (2) Allow global variables only. For example, the illustrative programming language may specifically disable local variable scopes. All variables are "global" named variables whose scope is the entire code, including both client side and server-side code. The net effect of these two design goals can be to specifically prevent re-use of both code and variables. Re-use of code and/or variables allows the user to produce code from which it is difficult or impossible for the compiler 110 to determine the programmer's intention. In fact, the implicit goal of Turing complete languages with local variable scoping, especially object-oriented languages, is to cause the programmer to produce reusable code e.g., libraries, which may be use in many different contexts and for many different purposes. In some embodiments, the present illustrative programming language, on the other hand, may enable the compiler 110 to comprehend, model and facilitate the user's exact purpose. By disabling re-use of code and variables, can force the user to describe the actions to be taken by the application in ways that provide the information necessary for the compiler 110 to exactly determine the users' purpose. In some embodiments, determining the user's purpose may be defined as being able to re-implement the user's described activities exactly, using any number of different allowable and valid choices for where to locate the data associated with variables and/or where to execute portions of code (client side or server side). For example, if all uses of a given variable are described by the use of that same variable (because it is global) in the code, then it becomes possible and simple to determine, should a change me made to the location of where the variable should be stored, which statements, and therefore which activities, will be affected.

In some embodiments, the illustrative programming language is a language that can use only global variables (e.g., no local variables). In some embodiments, the scope of all variables can be the entire code, including code defined in multiple action blocks. The entire code for the application can therefore be considered to have separate code blocks that can be invoked at any time, in any sequence, except insofar as that action blocks in simple chains can be combined to yield one.

In some embodiments, programming languages such as the illustrative programming language syntax can include parts of speech (e.g., "pos") defined as rules. In some embodiments, the source code 1 in the language can be parsed, yielding a tree data structure corresponding to the source code 1, with each node of the resultant data structure corresponding to a part of speech in the syntax, and each such data structure node being associated with a sub-section of the source code text which, when parsed, can conform to the corresponding syntax rules for the part of speech. Correspondingly, the source code 1 can be re-constructed by traversing the data structure and outputting the portions of text associated with the parts of speech associated with each node traversed. An exemplary detailed parsing algorithm is described in more detail with reference to FIG. 2 above.

In some embodiments, the present disclosure can include additional syntax rules, with corresponding additional parts of speech, that parse successfully based not only on the syntactic text of the language, but on the values stored in the code states and self analysis. (See State and Location aware parser). The additional rules can be shown as bolded portions in Appendix B. In some embodiments, the additional rules are referred to as "location sensitive parts of speech."

In some embodiments, the present disclosure can include a state and location aware parsing engine 120. In some embodiments, the parsing engine 120 can handle the calculation and retention of code states.

In some embodiments, the parser used to parse the illustrative programming language can be designed to maintain a *code state* that has a value prior to the start of parsing. (See for example, EXAMPLE 3 below detailing an example[ code state data structure).

In some embodiments, the code state can evolve during the process of parsing illustrative programming language code by updating the state at the successful conclusion of parsing of each syntactic element to produce a new state, using assertions, which are implemented as methods of the 'code_state object.' (See for example EXAMPLE 3 and EXAMPLE 4 detailed below).

In some embodiments, the prior states can be retained and associated with the start and end of each node in the parsed data tree. The rules can be associated with each syntactic part of speech governing how the state can be modified between start and end. The assertions that can be made can depend on the part of speech, as detailed in EXAMPLE 4 below, which provides illustrative rules governing updating code state.

In some embodiments, at the conclusion of parsing, generated is a chain of code states. Each code state can be associated with a character position in the source code. The character position in the source code can represent the compiler's understanding of contextual information by considering the initial code state and source code to the left of the character position.

In some embodiments, at the conclusion of each part of speech, the parser can re-parse the chunk of source code associated with the part of speech separately, using a blank initial analysis state, and store the final such state obtained thereby with the part of speech. The aforementioned steps can be referred to as "self analysis." (See FIG. 2 detailed above).

In some embodiments, the part of speech node in the resultant data tree can include three code states: one corresponding to the compiler's understanding as of the character position just prior to (e.g., to the left) the part of speech, one for the end (e.g., as of after parsing the last character of the part of speech), and one corresponding to the state that can be achieved if the part of speech were parsed in isolation. These states can be referred to as the "start state" and the "end state", and the "Self-analysis" for the part of speech.

In some embodiments, the present disclosure can include location awareness.

In some embodiments, the code states can include two data items: the "current location" $curloc and there $where[ ] associative array, that describe location information. (See Appendix C: Code State data structure).

In some embodiments, the final application can include client-side code that can, at various points invoke, server-side routines using web-service style API calls, then wait for a response (e.g., if values are being passed back) before continuing. Server-side code for the associated API call can begin executing upon receiving the call, execute, return a response if appropriate, store any data that can be retained (if any), and then stop.

In some embodiments, statements, including higher-level parts of speech that involve multiple sub-statements can either (1) start, run and conclude completely on the server or (2) start and conclude on the client. The statements may or may not involve sub-statements that invoke server-side APIs as part of their function.

In some embodiments, the Current location $curloc in the code state can indicate whether, for a particular point in the code, the code at that point is assumed to be on the client, on the server, or that the location is indeterminate (e.g., that no specific location has yet been determined or specified).

In some embodiments, statements that start, run and conclude on the server can have the $curloc values for one or more code states within their sub-tree of the parsed code marked as "server." Statements that start and conclude on the client can have their $curloc values as of start and end state equal to "client" but can have differing values for intermediate code states between the start and the end.

In some embodiments, the present disclosure can include variable locations. The $where[ ] associative array can describe a single location value for unique variables used in the application that have assigned locations. To identify the location, $where[<variable identifier>] can have the value "client" or "server". As the code generation procedure progresses, a determination can be made as to what location specification should be made for the variables.

In some embodiments, when the value of $where[<variable name>] is set to "client," it means that the variable's data is resident on the client side and not necessarily on the server. It may be copied (e.g., passed) to the server temporarily as a read-only copy but may only be modified on the client by code running on the client.

In some embodiments, when the value of $where[<variable name>] is set to "server", it means that the variable's data is resident on the server side and not necessarily on the client. The value can be copied (e.g., passed) to the client as a read-only copy. In some embodiments, the value can only be modified on the server by code running on the server.

In some embodiments, the design assumption is that the data on the client side can be insecure since it can be located on the user's device and potentially accessible by the user. The design assumption for data residing on the server can either be hidden from the user completely or made read-only. As a result, the code generation process can be designed to place variables on the client side or copy server-side variables to the client, such as when necessary or specifically directed. This design assumption can be adjusted or tuned. For example, the system can be varied to favor the client side for performance, sacrifice some degree of security, to do so based on declarative guidance from the user, or to base it on inference.

In some embodiments, the present disclosure can include code generation. If Illustrative programming language source code is valid, it can be successfully parsed with or without the location sensitive parts of speech included. However, if the location sensitive parts of speech are included, the resultant source code tree can have information that can be used to identify a valid set of API calls from client to server. In some embodiments, the information can include the nodes of the tree that correspond to the location sensitive parts of speech. In some embodiments, the information can include the code states generated during the parse operation. Parsing without location-aware parts of speech can be used to determine code validity, followed by parsing with location sensitive parts of speech included to extract the definition of a valid corresponding set of server-side routines and to construct API calls to them. A valid corresponding set is one that can be parsed successfully. Since the parsing algorithm can include embedded location-dependency rules, the validity according to the syntax can indicate that the resultant structure conforms to the rules regarding location.

In some embodiments, when parsing is performed using all parts of speech including location sensitive parts of speech indicating location-specific syntax (e.g., client-specific syntax and/or server-specific syntax, among others), the nodes in the resultant data structure corresponding to the type server-side-section that are not contained within another server side section can each correspond to a server-side API call. An example a complete process of code generation is detailed in EXAMPLE 5 below.

In some embodiments, when calls are identified, the variable to be passed to, or returned from, the calls can be identified and stored within an argument analysis structure, which can be used to generate the code for the API calls. An example of an Argument Analysis structure is described in more detail below in EXAMPLE 6.

In some embodiments, the present disclosure can include dynamically adaptive database schema. In some embodiments, the present disclosure can utilize a run-time adaptive database schema modification mechanism to generate and incrementally improve the database schema at run-time.

In some embodiments, the present disclosure can allow "tuning" of code generation by varying the priority of location. In some embodiments, the algorithm can avoid placing data on the client side whenever possible, for security reasons. In some embodiments, the algorithm can place data exclusively on the client side whenever possible, in order to prioritize performance over security. In some embodiments, the user can identify, for specific variables, what their prioritization, or level of security sensitivity, should be.

In some embodiments, the parsing approach for identification of server side calls can use constraint propagation on the parsed tree, separately identifying which nodes are part of each API call, and building that data structure via constraint propagation rather than via parsing.

Example 2—Programming Language Syntax Configured for Automated API Determination, Generation and Integration In some embodiments, the illustrative programming language for the present disclosure may include a specialized syntax for use with the compiler 110 of the full-stack development automation system 100. Example code illustrating the illustrative programming language may be as follows:

Example Code

```
numeric:
    string made up of characters in:
        "0123456789"
non_numeric :
    string made up of characters in:
        "abcdefghijklmnopqrstuvwxyzABCDEFGHIJKLMNOPQRSTUVWXYZ_"
identchar :
    string made up of characters in:
        "0123456789abcdefghijklmnopqrstuvwxyzABCDEFGHIJKLMNOPQRSTUVWXYZ_"
```

```
_constant :
  one of:
    "special_constant",
    "_number",
    "_string"
special_constant:
  one of:
    "null",
    "true",
    "false",
    "always"
_identifier :
  sequence of: "non_numeric",(zero or more instances of: "identchar")
named_variable_ref :
  "_identifier"
array_modifier:
  sequence of: "[", "exp", "]"
dot_modifier :
  sequence of: ".", "_identifier"
modifier:
  one of :
    "array_modifier"
    "dot_modifier"
modifiers:
  one or more instances of: "modifier"
modified_varref:
  sequence of: "varref_1", "modifiers"
varref:
  one of:
    "modified_varref"
    "named_variable_ref"
parenexp:
  sequence of: "(", "exp", ")"
exp:
  one of:
    "binopexp",
    "server_side_section"
    "funcname_with_arglist",
    "preopexp",
    "parenexp",
    "_constant",
    "varref"
server_side_section
  One of:
    server_side_list_of_statements
    server_side_expression
server_side_list_of_statements
  one or more instances of:
    possibly_server_side_statement
server_side_expression
  one of:
    "server_bound_modified_varref"
    "server_bound_named_variables_ref"
    "server_specific_exp"
possibly_server_side_statement
  "_statement"
  where _statement is
    specific (see note 3 above) OR
    agnostic (see note 4 above)
server_specific_exp
  "exp"
  where exp is
    specific (see note 3 above) AND
    not agnostic (see note 4 above)
server_bound_modified_varref
  "modified_varref"
  Provided that:
    Type of the target variable according to the Code state at start is a "server bound type" (see Note
2 above)
server_bound_named_variable_ref
  "named_variable_ref"
  Provided that:
    Type of the target variable according to the Code state at start is a "server bound type" (see Note
2 above)
binopexp :
  sequence of: "exp", "binop", "exp"
preopexp:
  sequence of: "preop", "exp"
```

```
binop:
  one of:
    "+","-","*","/","&&","||","<=","<",">=",">","==","!=","&","|"]
preop:
  one of:
    "-","!"
arglist :
  sequence of: "(", "args", ")"
args :
  zero or more instances of:
    "exp"
  separated by:","
assignment:
  sequence of: "varref", "=", "exp"
ifstmt:
  sequence of: "if", "parenexp", "__statement"
ifelsestmt:
  sequence of: "if", "parenexp", "__statement", "else", "__statement"
__statement :
  one of:
    "assignment",
    "__block",
    "ifelsestmt",
    "ifstmt",
    "__subroutine_def",
    "funcname_with_arglist"
list_of_statements :
  one or more instances of: "__statement"
block:
  sequence of: "{", "list_of_statements"," }"
funcname_with_arglist:
  sequence of: "__identifier","arglist"
codefragment :
  one or more instances of: "list_of_statements"
```

In some embodiments, for simplicity, whitespace and compiler directives may be removed.

In some embodiments, a "server_bound_type" may be a type for which there is a hard-coded rule (e.g., taken from a config file) specifying that, for the specific type, writes and/or reads can occur on the server. This is assumed to be the case if the type is a query or an object taken from, or written to, the database (e.g., a cloud object).

In some embodiments, an expression can be considered server side specific if it is the result of a call to a function that has been configured to be a 'server_side_specific' function (e.g., according to config file). Those can be functions that only have a server-side definition and do not have a client-side definition. A function can be agnostic if it has definitions on both the client side and the server side. (e.g., the string concat( ) function).

In some embodiments, a statement can be considered server side specific if it is a call to a function that has been configured to be a server_side_specific function (according to config file).

In some embodiments, a statement can be considered server side specific if it is an assignment to a variable whose implicit type can be: Not null, meaning there has been some information implying what type it is (e.g., $start_state→$type[varname]!=null). The same according to the code state at the start AND at the end of the parse of the assignment (e.g., nothing occurred causing change of implicit type). For example, the code can be $start_state→$type[varname]=$end_state→$type[varname]. A server bound type. Tagged as living on the server side. This can be detected by seeing if the left-hand side (e.g., varref) of the assignment is located on the server according to the code state at the start. For example: $start_state→where [varname]=="server"

In some embodiments, a statement or expression can be considered server side agnostic if it is a constant or if the '$curloc' value of its 'code_state' at the end of parsing is "null."

Example 3—Code State Data Object

In some embodiments, each code state data structure can include information describing the compiler's 110 then-current understanding. For example:

```
class code_analysis_data {
    var $curloc = null;      // current location
    var $id = null;
    var $written = array( );  // [name] => true. means var was written by the code (NOTE: this means *completely* writeen, not edited. )
    var $read = array( );     // [name] => true. means var was read by the code
    var $affected = array( ); // [name] => true. means var was written in ANY WAY by the code e.g., written completely OR edited
    var $created = array( );  // [name] => true. means var was created by the code e.g., written before read
    var $modified = array( ); // [name] => true. means var was modified by the code e.g., either edited or written after read
    var $args = array( );     // [name] => true. says the var is an argument, meaning read before written
```

```
    var $all = array( );           // [name] => true. all var names
    var $called = array( );        // [name] => true. all function calls
    var $where = array( );         // [name] => location. all specific server locations (e.g. "server" or "client"
required)
    var $type = array( );          // [name]=>type (type is a string)
    // call this (in chronological order) to note where a specific variable (or function) is located e.g.
"client", "server"
    // specifier is the thing declaring so . (usually a part of speech)
    function specify_location($name,$where,$specifier = null) {
        if ($where) $this->where[$name] = $where;
        else unset($this->where[$name]);
    }
    // call this to declare that a given var is of a specific type
    function specify_type($name,$type) {
        global $typesManager;
        $typesManager->specify_type($name,$type);
        if ($type) $this->type[$name] = $type;
        else unset($this->type[$name]);
    }
    // call this to declare that a given var has a sub-component of a specific type
    function specify_type_of_component($name,$modifiers,$type) {
        global $typesManager;
        $typesManager->specify_type_of_component($name,$modifiers,$type);
    }
    // call this (in chronological order) to note that a call was made
    function log_call($name) {
        $this->called[$name] = true;
        $this->all[$name] = true;
    }
    // call this (in chronological order) to note that a var was read
    function log_read($name) {
        if (!isset($this->written[$name])) $this->args[$name] = true;
        $this->read[$name] = true;
        $this->all[$name] = true;
    }
    // call this (in chronological order) to note that a var was written
    function log_write($name) {
        if (!isset($this->read[$name]) && !isset($this->written[$name])) $this->created[$name] = true;
        else if ($this->read[$name]) $this->modified[$name] = true;
        $this->affected[$name] = true;
        $this->written[$name] = true;
        $this->all[$name] = true;
    }
    // call this (in chronological order) to note that a subcomponent of a var was written.
    // $modifiers_array is an array of modifiers
    function log_modified_write($name, $modifiers_array) {
        $this->affected[$name] = true;
        $this->modified[$name] = true;
        $this->all[$name] = true;
    }
    // returns all the args
    function find_args( ) {
        return array_keys($this->args);
    }
    // depending on what you want, this gives back an array of [varname]=>true
    // $what is 'args','written', or 'called'
    public function get_vars_list($what) {
        switch($what) {
            case 'args': return $this->args;
            case 'written': return $this->written;
            case 'called': return $this->modified;
        }
    }
    // returns readonly args
    function find_readonly_args( ) {
        $result = array( );
        foreach($this->find_args( ) as $arg) if (!$this->written[$arg]) $result[ ] = $arg;
        return $result;
    }
    // returns the names that were output vals e.g., created by the code
    function find_outputs( ) {
        return array_keys($this->created);
    }
    /**
     * returns the locations that were required
     * $set is the name of the set of names we are looking to look at (e.g. 'all','created','modified',.. )
     *
     * returns an array of all the locations needed to access that set of things.
     * e.g., the union of all the necessary locations where they live.
```

```
 *
 */
function find_locations($set='all') {
    $ar = array( );
    if (is_array($this->{$set})) foreach($this->{$set} as $varname=>$dummy) {
        // this will be null if var can be accessed anywhere,
        // 'client' if it can only be accessed on the client
        // 'server' if it can only be accessed on the server and
        $where_is_var = $this->get_location_for_var($varname);
        if ($where_is_var) $ar[$where_is_var] = true;
    }
    return array_keys($ar);
}
/**
 * returns the types that were required
 * $set is the name of the set of names we are looking to look at (e.g. 'all','created','modified',... )
 *
 * returns an array of all the types for that set of things.
 * e.g., the union of all their types
 *
 */
function find_types($set='all') {
    $ar = array( );
    if (is_array($this->{$set}))foreach($this->{$set} as $varname=>$dummy) {
        $type_for_var = $this->get_type_for_var($varname);
        if ($type_for_var) $ar[$type_for_var] = true;
    }
    return array_keys($ar);
}
protected function get_types_for_var($varname) {
    return $this->type[$varname];
}
/**
 * this will be null if var can be accessed anywhere,
 * 'client' if it can only be accessed on the client
 * 'server' if it can only be accessed on the server
 */
protected function get_location_for_var($varname) {
    return $this->where[$varname];
}
// find the calls that were made
function find_calls( ) {
    return array_keys($this->calls);
}
}
```

Example 4—Rules Governing Update of Code State Data Object

In some embodiments, each part of speech, when parsed, can update the code state by calling its 'update_code_analysis' method.

In some embodiments, an illustrative 'update_code_analysis' method for named_variable_ref may include:

```
function update_code_analysis(&$analysis,$write_p = false )
{
    if ($write_p) $analysis->log_write($this->ident);
    else $analysis->log_read($this->ident);
}
```

In some embodiments, an illustrative 'update_code_analysis' method for array_modifier may include:

```
function update_code_analysis(&$analysis,$write_p = false)
{
    $exp = $this->get_values();
    $exp->update_code_analysis($analysis,false);
}
```

In some embodiments, an illustrative 'update_code_analysis' method for dot_modifier may include:

```
function update_code_analysis(&$analysis,$write_p = false)
{
}
```

In some embodiments, an illustrative 'update_code_analysis' method for modified_varref may include:

```
function update_code_analysis(&$analysis,$write_p=false)
{
    // get the left hand side (vref) and the right hand side (array of modifiers)
    list($vref,$modifiers) = $this->get_values( );
    foreach($modifiers->values as $modifier) {
        // for each modifier, tell the analysis that we are reading it (in case it is a subscript)
        $modifier->update_code_analysis($analysis,false);
    }
```

```
// now tell the left hand side we are reading/writing it with modifiers
$vref->update_code_analysis($analysis,$write_p,$modifiers->values);
}
```

In some embodiments, an illustrative 'update_code_analysis' method for parenexp may include:

```
function update_code_analysis(&$analysis,$write_p = false)
{
    $a = $this->get_values( );
    $a->update_code_analysis($analysis,$write_p);
}
```

In some embodiments, an illustrative 'update_code_analysis' method for server_side_section may include:

```
function update_code_analysis(&$analysis,$write_p = false) {
    $this->stmt->update_code_analysis($analysis,$write_p);
}
```

In some embodiments, an illustrative 'update_code_analysis' method for server-side-list-of-statements may include:

```
function update_code_analysis(&$analysis,$write_p = false) {
    foreach($this->get_values( ) as $stmt) {
        $stmt->update_code_analysis($analysis,false);
    }
}
```

In some embodiments, an illustrative 'update_code_analysis' method for server_side_expression may include:

```
function update_code_analysis(&$analysis,$write_p = false) {
    $this->exp->update_code_analysis($analysis,$write_p);
}
```

In some embodiments, an illustrative 'update_code_analysis' method for possibly_server_side_statement may include:

```
function update_code_analysis(&$analysis,$write_p = false) {
    $this->stmt->update_code_analysis($analysis,$write_p);
}
```

In some embodiments, an illustrative 'update_code_analysis' method for binopexp may include:

```
function update_code_analysis(&$analysis,$write_p = false)
{
    $ar = $this->get_values( );
    $ar[0]->update_code_analysis($analysis,false);
    $ar[2]->update_code_analysis($analysis,false);
}
```

In some embodiments, an illustrative 'update_code_analysis' method for preopexp may include:

```
function update_code_analysis(&$analysis,$write_p = false)
{
    $ar = $this->get_values( );
    $ar[1]->update_code_analysis($analysis,false);
}
```

In some embodiments, an illustrative 'update_code_analysis' method for arglist may include:

```
function update_code_analysis(&$analysis,$write_p = false)
{
    foreach($this->get_values( ) as $stmt)
        $stmt->update_code_analysis($analysis,false);
}
```

In some embodiments, an illustrative 'update_code_analysis' method for assignment may include:

```
function update_code_analysis(&$analysis,$write_p = false)
{
    // get the left hand (vref) and right hand (exp) sides
    list($vref,$exp) = $this->get_values( );
    // let the exp update the analysis saying we are reading it
    $exp->update_code_analysis($analysis,false);
    // let the vref update the analysis saying we are writing it
    $vref->update_code_analysis($analysis,true);
    // if the right hand side has a specific type, tell the left hand side that it
    will now have that type
    $type = $exp->specific_output_type( );
    if ($type) {
        // note that for some reason the & in this next line caused a crash
        // on deployment server running php 5.4.43
        //$vref->specify_type(&$analysis,$type);
        $vref->specify_type($analysis,$type);
    }
}
```

In some embodiments, an illustrative 'update_code_analysis' method for ifstmt may include:

```
function update_code_analysis(&$analysis,$write_p = false)
{
    $ar = $this->get_values( );
    $ar[0]->update_code_analysis($analysis,false);
    $ar[1]->update_code_analysis($analysis,$write_p);
}
```

In some embodiments, an illustrative 'update_code_analysis' method for ifelsestmt may include:

```
function update_code_analysis(&$analysis,$write_p = false)
{
    $ar = $this->get_values();
    $ar[0]->update_code_analysis($analysis,false);
    $ar[1]->update_code_analysis($analysis,$write_p);
    $ar[2]->update_code_analysis($analysis,$write_p);
}
```

In some embodiments, an illustrative 'update_code_analysis' method for list_of_statements may include:

```
function update_code_analysis(&$analysis,$write_p = false)
{
  foreach($this->get_values( ) as
  $stmt)$stmt->update_code_analysis($analysis,false);
}
```

In some embodiments, an illustrative 'update_code_analysis' method for_block may include:

```
function update_code_analysis(&$analysis,$write_p = false)
{
  foreach($this->get_values( ) as
  $stmt)$stmt->update_code_analysis($analysis,false);
}
```

In some embodiments, an illustrative 'update_code_analysis' method for funcname_with_arglist may include:

```
function update_code_analysis(&$analysis,$write_p = false)
{
  if ($this->args) foreach($this->args->get_values( ) as $arg) {
    $arg->update_code_analysis($analysis,false);
  }
  $analysis->log_call($this->the_funcname( ));
  if ($loc = $this->specific_location( )) {
    $analysis->specify_location($this->the_funcname( ),$loc,$this);
  }
  $analysis->specify_type($this->the_funcname( ),'function');
}
```

Example 5—Another Rules Governing Update of Code State Data Object not Using Parsing of Location Sensitive Parts of Speech In some embodiments, the parsing APIs (as opposed to parsing with location-aware parts of speech) is to directly identify them from the parsed code tree. For example, an exemplary algorithm is as follows:
 1. Those parts of the code tree that contain operations for which server-side operation is mandatory are identified. These include (a) function calls for functions that are not available on the server side (b) operations involving data types that are not available on the client side because their storage and retrieval involves database operations.
 2. The code tree is traversed to merge those parts with adjacent parts that are either also server side specific or may be considered server-side agnostic, with the rule that a block of statements may not be considered to be server side specific unless there are no client-side specific statements contained within it. The traversal algorithm is as follows:

```
function flatten(dst,node) {
    array_push(dst,node)
    if (node->subs) foreach(node->subs as subnode) {
        array_push(dst, subnode);
    }
}
function left(node) {
    if (!node.parent) return null;
    else {
        var i = indexOf(node,node.parent.subs) - 1;
        return (i < 0) ? null : node.parent.subs[i];
    }
}
function right(node) {
    if (!node.parent) return null;
    else {
        var i = indexOf(node,node.parent.subs) + 1;
        return (i >= count(node.parent.subs)) ? null :
        node.parent.subs[i];
    }
}
ar = array( );
flatten(ar,root);
// propagate location flags up
foreach(ar as p) if (p.requires_server) {
    while(p=p.parent) p.requires_server = true;
}
foreach(ar as p) if (p.requires_client)
    while(p=p.parent) p.requires_client = true;
}
// if it is server side dependent..
foreach(ar as n) if (!n.section && n.requires_server) {
    // give it a section
    n.section = new section( );
    // go up and see how far up you can go until you find a parent that
    // cannot be server-side dependent
    for (; n.parent && !n.parent.requires_client ; n=node.parent) {
        n.parent.section = n.section;
    }
    // now go left and see how many you can add
    for (p=n; left(p) && !p.requires_client; p=left(p)) {
        left(p).section = n.section;
    }
    // now go right and see how many you can add
    for (p=n; right(p) && !p.requires_client; p=right(p)) {
        right(p).section = n.section;
    }
}
// now collect the sections
sections = array( );
foreach(ar as node) {
    if (node.section && !in_array(sections, node.section)) {
        array_push(sections,node.section);
    }
}
```

3. The location of variables created or modified within a server side section is updated to reflect side specificity resulting from the results of the scan made in step 2
 4. The process continues from step 2 until there are no more changes.

Example 6—Code Generation Method

In some embodiments, code generation can include any or all of the following steps:
 1. Consolidation of action blocks. In some embodiments, the visual diagram file from the graphical IDE for the application can be traversed. Any action block elements that are chained (e.g., they connect to only one preceding and/or following block with non-conditional connectors) can be concatenated into a single block.
 2. Source code registration. In some embodiments, for every element in the visual diagram file that has source code associated with it, all such bits of Exo source code can be registered. For example, the element can be assigned a unique key (e.g., hash of the source code) and tagged as to whether it is a statement or an expression.
 3. Simplification. In some embodiments, using a parser for which all location sensitive parts of speech have been disabled. Registered sources can be transformed according to any or all of the following rules:
    a. Comments and redundant whitespaces can be removed b. Blocks that appear inside other blocks can be broken apart into a single block c. "if" or "ifelse" statements, for which the condition expression is not a simple variable reference, can be replaced with an assignment to a temporary variable, followed by the if statement with the condition expression being the temporary variable. For example, an if statement such as "if (<exp>) { ... }" can be replaced by:

```
tmpxxx = <exp>
if (tmpxxx) { ... }
``` d. Similarly, in some embodiments, software interface calls whose arguments include expressions that are not simple variable references can be replaced with assignments to temporary variables, followed by the software interface call (or statement that included the software interface call) with the relevant arguments replaced with the corresponding variables.

4. Root state. In some embodiments, an initial code state object can be allocated and initialized with any internal system global variables, with their types and locations.

5. Type gathering, In some embodiments, starting with the root state, registered source code fragments can be parsed by using a parser for which all location sensitive parts of speech have been disabled. The $type array of the final end code state can be copied to the root state, replacing the $type array there.

6. Initial Location determination. In some embodiments, starting with the root state, the registered source code fragments can be parsed by using portions of Appendix B (e.g., *with* the location sensitive parts of speech).

7. Registration of parsed code trees. In some embodiments, for a resultant parsed data tree, the root of the tree can be recorded and associated with keys from step 2 above. Code generation can include scanning through the nodes of the data tree in depth-first order. For each node of the tree, code generation can include assigning a unique id and recording it in an associative array, $all_pos, indexed by id.

8. Variable types are determined. In some embodiments, the $type array of the end code state for each node recorded in $all_pos is examined and gathered, such that we end up with a a combined array that lists all types assumed for each named variable. As illustrated by the following example code:

```
/**
 * this calculates the types of ALL variables. it must be called AFTER
at least one precompilation
 * of all source, since it needs to consider all sources.
 * result is an array of format [varname][type]=true
 *
 *@return array
 */
private function determine_all_var_types( ) {
  $ar = array( );
  foreach($this->all_pos as $id=>$pos) {
    foreach($pos->state_after->type as $varname => $ty) {
      $ar[$varname][$ty] = true;
    }
  }
  return $ar;
}
```

9. Variable locations can be determined. In some embodiments, the $where array of the end code state for each node recorded in $all_pos is examined and gathered, such that we end up with a combined array that lists a single location assumption for each named variable. If more than one location (eg. "client" and "server") is encountered for a variable, its location is assumed to be "client" since a variable whose value lives on the client can be passed back and for the between client and server, but a variable that lives on the server can be read only as far as the client is concerned. As illustrated by the following example code:

```
private function determine_all_var_locations( ) {
  $ar = array( );
  foreach($this->all_pos as $id=>$pos) {
    foreach($pos->state_after->where as $varname => $loc) {
      if ($loc && !$ar[$varname]) $ar[$varname] = $loc;
      else if ($loc && $ar[$varname] && ($loc != $ar[$varname])) {
        //$ar[$varname] = 'both';
        // if we got here it means that there are two pieces of code
        writing the same
        // var, one on the server side and one on the client side.
// in such a case, we should default to the CLIENT, since a
        var that lives on the client
        // can be passed to the server and passed back, but a var that
        lives on the server
        // should be READ ONLY as far as the client is concerned
        $ar[$varname] = "client";
      }
    }
  }
  return $ar;
}
```

10. In some embodiments, a new starting state can be created, using the initial state defined in step 8 above, but copying the $where and $type arrays from the final state after step 9. In some embodiments, the combined code is:

```
$all_var_types = $this->determine_all_var_types( );
$root_state->where = $this->determine_all_var_locations( );
foreach($all_var_types as $varname=>$ar) {
  foreach($ar as $ty=>$dummy) {
    $root_state->type[$varname]=$ty;
  }
}
```

11. In some embodiments, the $curloc property of every code state object can be recalculated. Starting with the $root_state, we scan all nodes of all code trees in depth_first order, (e.g., the equivalent of moving left to right in the corresponding source code). In some embodiments, the $curloc property for the code state can be recalculated as follows:

a. Using the $called property of the "self analysis" property of the code state and, if the part of speech that ends with the code state includes a single software interface call, and the software interface call requires a specific location, set the $curloc value to that location.

b. Using the $called property of the "self analysis" property of the code state and, if the part of speech that ends with the code state includes more than one software interface call, and the software interface calls require more than one specific location, set the $curloc value to "both".

c. If none of those condition arose, check all of the variables written or modified within the part of speech, and if any of them have a corresponding location of "server", set the $curloc to "server".

d. If none of those condition arose, check all of the variables written or modified within the part of speech, and if any of them have a type that is a server bound type, set the $curloc to "server".

In some embodiments, an example of full code for recalculating is as follows:

```
/**
 * updates the specificity (e.g., the $where array and the $curloc)
 * for the execution of a piece of code (ie a parsed tree)
 * $spec as passed should be the analysis object as of prior to the ststement.
 * on completion, the curloc will either be null (meaning it doesnt matter)
 * or the name of a location, or 'indeterminate' meaning the code cannot run in only one
 * place.
 *
 * @param part_of_speech_interface $obj
 * @param code_state_interface $state
 */
function recalculate( ) {
    $orig_state = $this->previous;
    $new_state = $this;
    $obj = $this->obj;
    if (!($obj && $orig_state)) return;
    // set up a new code analyis object with no activity but knows wereand whaat things are
    $q = new advanced_analysis( );
    $q->where = $orig_state->where;
    $q->type = $orig_state->type;
    // save it
    $obj->self_analysis = $q;
    // update it using the object so we can get the args, etc
    $obj->update_code_analysis($q);
    // at this point $q and $this->self_analysis represent the activity of this part of speech,
    // using prior assumptions about location that were reflected in spec as passed into this function.
    // find out where the calls are
    $locs = $q->find_locations('called');
    switch(count($locs)) {
        // if there is one and only one needed, thats where we will run
        case 1:
            $curloc = array_shift($locs);
            break;
        // if the count is undetermined, we still havent decided anything
        case 0:
            $curloc = $orig_spec->curloc;
            break;
        // if multiple, set it as 'both'
        default:
            $curloc = 'both';
            break;
    }
    // if none of that happened, lets look at all vars written or modified
    // and see if they have been designated to live on the server, meaning they can only be modified there.
    if (is_null($curloc)) {
        foreach(array_merge($q->modified, $q->written) as $var=>$dummy) {
            if ($this->where[$var] == 'server') {
                $curloc = 'server';
                break;
            }
        }
    }
    // if none of that happened, lets look at all vars "written" (i/e. a complete change of value)
    // and see if their types require writes to only happen on the server
    if (is_null($curloc)) {
        foreach($q->written as $var=>$dummy) {
            if ($q->type[$var] && is_server_bound_type($q->type[$var], "writing")) {
                $curloc = 'server';
                break;
            }
        }
    }
    // if none of that happened, lets look at all vars "modified" (i/e. edited. one of their sub-values changed as in a.b = c or a[b] = c)
    // and see if their types require writes to only happen on the server
    if (is_null($curloc)){
        foreach($q->modified as $var=>$dummy) {
            if ($q->type[$var] && is_server_bound_type($q->type[$var], "modifying")) {
                $curloc = 'server';
                break;
            }
```

```
        }
    }
// and same thing for reading. note that this only affects the location if it is still
// not driven by anything else
    if (is_null($curloc)) {
        foreach($q->read as $var=>$dummy) {
            if ($ty = $q->type[$var]) {
                if (is_server_bound_type($ty,"reading")) {
                    $curloc = 'server';
                    break;
                }
            }
        }
    }
/*
// if no specific locations, we look at the arguments to see where they live
// (normally this means where they were written)
    if (count($locs) == 0) {
        $locs = $q->find_locations('args');
    }
    switch(count($locs)) {
        // if there is one and only one needed, thats where we will run
        case 1:
            $curloc = array_shift($locs);
            break;
        // if the count is undetermined, we will use the last location
        case 0:
            $curloc = $orig_spec->curloc;
            break;
        // if multiple, set it as 'both'
        default:
            $curloc = 'both';
            //$curloc = 'client';
            break;
    }
*/
// set it in the specificity
    $new_state->curloc = $curloc;
// now that we have a location, make sure any variables created will live there
// and have the given type
    if ($curloc && ($curloc != 'both')) foreach(array_keys($q->written) as $vname) {
        $q->where[$vname] = $curloc;
    }
    $new_state->where = $q->where;
    $new_state->type = $q->type;
}
```

12. In some embodiments, step 4 through 11 may be repeated. For example, the process can include identifying the final code state, which indicates the locations and types of all variables and function calls, and using it as the new root state, throw out the other code states, and re-do the entire set of steps. This can be advantageous because assumptions made in one part of the code may end up changing the structure of other parts, so feeding back the output and repeating the process can be a form of constraint propagation.

13. In some embodiments, code generation can include finding the writers and readers for each variable. For each variable, code generation can include identifying which parts of speech contain code that writes a value to the variable, and which parts of speech read data from the variable. For example, the code can be as follows:

```
// find the writers and readers . for each variable, says which syntactic elements
// write it. etc
foreach($this->all_pos as $id => $pos) {
    foreach($pos->self_analysis->affected as $varname => $dummy)
        $this->var_writers[$varname] [$id] = $pos;
    foreach($pos->self_analysis->read as $varname => $dummy)
        $this->var_readers [$varname][$id] = $pos;
    foreach($pos->self_analysis->args as $varname => $dummy)
        $this->var_needs_arg[$varname][$id] = $pos;
    foreach($pos->self_analysis->created as $varname => $dummy)
        $this->var_creates_arg[$varname][$id] = $pos;
}
```

In some embodiments, code generation can include identifying all the server_side_section parts of speech within the code, which parts of speech are inside a server_side_section (e.g., lie within the sub tree of a server side section). For example, the code can be as follows:

```
// get all the server side sections
foreach($this->all_pos as $id => $pos) {
    if (get_class($pos) == 'server_side_section') $this->sss[$id] = $pos;
}
// mark which ones are inside a server side section
foreach($this->sss as $sss) {
    $ar = array( );
    walk_parsed_code($ar,$sss);
```

-continued

```
foreach($ar as $pos) if ($pos != $sss) {
    $this->is_inside_sss[$pos->id] = $pos;
    $pos->is_inside_sss = true;
    $pos->sss_parent = $sss;
  }
}
```

14. In some embodiments, code generation can include identifying all the server side calls. These can be server_side_section nodes that do not lie within another server_side_section, and are not location agnostic. For example, the code can be as follows:

```
// * * * find the server calls. these are server side sections not inside
another one
foreach($this->sss as $id => $sss) {
    // do a final check for server specificity. this is because server side
sections may still be completely agnostic
    // and therefore we dont have to run them server side.
    $agnostic = is_server_side_agnostic($sss);
    $specific = is_server_side_specific($sss,'server');
    // also lock out the ones that are inside another one.
    if (!$agnostic && $specific && !$sss->is_inside_sss) {
        $this-> servercalls [$id] = $sss;
        $sss->is_servercall = true;
    }
}
```

15. In some embodiments, code generation can include determining which part of speech nodes are within a server call and which are not, and recording the fact. For example, the code can be as follows:

```
// figure out what is inside a servercall and what isnt
foreach($this->servercalls as $call) {
    $ar = array( );
    walk_parsed_code($ar,$call);
    foreach($ar as $pos) {
        $this->is_inside_servercall[$pos->id] = $pos;
        $pos->is_inside_servercall = true;
        $pos->servercall_parent = $sss;
    }
}
// mark which ones are client side or server side
foreach($this->all_pos as $id => $pos) {
    if (isset($this->is_inside_servercall[$id])) {
        $this->is_on_server[$id] = $pos;
        $pos->is_on_server = true;
    }
    else if (($pos->run_location != 'both') && ($pos->run_location !=
'server')){
        $this->is_on_client[$id] = $pos;
        $pos->is_on_client = true;
    }
}
```

16. In some embodiments, code generation can include giving each part of speech node an argument analysis object (see Appendix F: Argument analysis structure) and populate it with the arguments associated with the part of speech. For example, the code can be as follows:

```
foreach($this->all_pos as $id => $pos) {
    if (!isset($pos->argument_analysis)) $pos->argument_analysis = new
argument_analysis($pos);
    if($pos->self_analysis) foreach($pos->self_analysis->find_args( ) as
$argname) {
        //$pos->argument_analysis->args[$argname] = true;
        $pos->argument_analysis->declare_argument($argname);
    }
}
```

17. In some embodiments, the argument analysis doesn't necessarily have to be an object as long as the information it holds is associated with the part of speech.
18. For server calls, code generation can include determining what variables can be passed to the server as arguments, which can be passed back to the client as return values, and which can be retained on the server as values that will potentially be needed by other server-side code. In some embodiments, code generation can include identifying, for each output of data from each server side call (e.g., values that will be passed back to the client or retained on the server), which code will be a consumer of the information. In some embodiments, when generating code for the client side, code generation can include instructions for causing the code to pause until the values it needs become available from the server, and so that when code for the server is generated that requires retained values to be loaded, code can be inserted to load those values. An example procedure for this is as follows:

```
// now for each server side section that is not inside another one we calculate which written vars are
arguments
// (inputs) to code on the client side and therefore need to be passed back up as results
foreach($this->servercalls as $ssid => $sss) {
    // make sure the server side section has an argument analysis object
    if (!isset($sss->argument_analysis)) $sss->argument_analysis = new argument_analysis($sss);
    // get the vars I have written [varname]=>true
    $written_by_me = $sss->self_analysis->affected;
    // mark the variables needed by the client e.g., that we (the server ) will have to send back.
    // These will be the that are read by parts of sspeech that are on the client and that I am writing to
    // also remember the consumers of my output vars [varname][id]=>object
    // these will be those that are not underneith a server side section and that read
    // a var that I write to
    foreach($this->is_on_client as $id => $pos) {
        foreach($pos->self_analysis->read as $varname=>$dummy) {
            if (isset($written_by_me[$varname])) {
                $needed_by_client[$varname] = true;
                $consumers [$varname][$id]=$pos;
                $sss->argument_analysis->output_should_be_sent_to_client($varname);
            }
        }
    }
}
// mark the vars vars I am writing but that may still be needed on the server side (e.g., server
```

```
process state vars)
    // and remember the consumers.
    foreach($this->servercalls as $id => $pos) {
        if ($id != $ssid) {
            foreach($pos->self_analysis->read as $varname=> $dummy) {
                if (isset($written_by_me[$varname])) {
                    $consumers [$varname][$id]=$pos;
                    // at this point we know that var $varname is written by me
                    // and needed by another server call $pos with id $id.
                    // if the var is designated as "client" side then there are other writers
                    // and wen cant pass it sideways via the session.
                    if ($this->all_var_locations[$varname] == "client") {
                        $needed_by_client[$varname] = true;
                        $sss->argument_analysis-
>output_should_be_sent_to_client($varname);
                    }
                    // otherwise we pass it via the session
                    else {
                        $output_should_be_retained_on_server[$varname] = true;
                        $sss->argument_analysis-
>output_should_be_retained_on_server($varname);
                        $this->var_is_retained_in_session[$varname] = true;
                    }
                }
            }
        }
    }
    // for the server only outputs, mark them in the *consumer* as as server only inputs.
    foreach($sss->argument_analysis->outputs_for_server as $varname => $dummy) {
        foreach($consumers[$varname] as $consumer) {
            if (!isset($consumer->argument_analysis)) $consumer->argument_analysis = new
argument_analysis($consumer);
            $consumer->argument_analysis->argument_should_be_read_from_server($varname);
        }
    }
    // for each output to the client, mark the client-side receivers (e.g., any client side statement)
    // or expression that needs it) with the dependency
    // for each output ...
    foreach($sss->argument_analysis->outputs_for_client as $varname => $dummy) {
        // check each of its consumers ...
        foreach($consumers[$varname] as $pos) {
            // if it is on the client ...
            if ($pos->is_on_client) {
                // if it isnt a statement, move up until we get to the nextmost
                while($pos->parent && !$pos->is_statement) $pos = $pos->parent;
                // and set the dependencies. this will cause it to wait before executing
                if (!$pos->dependencies) $pos->dependencies = array( );
                $pos->dependencies[$varname] = true;
                $this->all_dependency_vars[$varname] = true;
            }
        }
    }
    // handle the special case of state vars. e.g., when the sss is the ONLY consumer of a
    // var bt it needs to be preserved in the session anyway for state. regardless of whether anyone else
needs it
    // e.g. var = (var ? var + 1 : 1)
    foreach($this->servercalls as $ssid => $sss) {
        // for each var that I read
        foreach($sss->self_analysis->args as $varname=>$dummy) {
            // and also write
            if ( $sss->self_analysis->affected[$varname]
                // and dont pass to any other server section (meaning I am the only server side section
one reading it)
                && !$sss->argument_analysis->outputs_for_server[$varname]
                // and dont get from any other server section (meaning I am the only only server side
section writing it)
                && !$sss->argument_analysis->args_from_server[$varname] ) {
                // see if anything on the client side writes it
                $client_side_writers = array( );
                foreach($this->var_writers[$varname] as $id=>$pos) {
                    if ($pos->is_on_client) {
                        $client_side_writers[$id] = $pos;
                    }
                }
```

```
         // if nothing, then it is a state variable!
         if (!count($client_side_writers)) {
            $sss->argument_analysis->output_should_be_retained_on_server($varname);
            $sss->argument_analysis->argument_should_be_read_from_server($varname);
            $this->var_is_retained_in_session[$varname] = true;
         }
      }
   }
}
```

19. In some embodiments, the generating the code for the server side can include, for each server call, expanding a macro template to produce source code and comment documentation for the API call similar to the following.

In some embodiments, the function genPhp( ) can be a function to generate server-side code using a conventional compiler for the target server-side language. For example, php can be:

```
/**
 * Auto Generated Code for Server Side Section.
 * ID : <? echo $this->id ;? >
 * Belonging To Diagram Element : <? if ($this->metadata && ($diag_el = $this->metadata['diagram_element']))
echo $diag_el->name ;? >
 * Source Code : <? $indent = "\n * "; echo $indent . str_replace("\n", $indent, $this->text); ?>
 *
 * Args passed from client : <? echo implode(", ",array_keys($args_from_client)); ?>
 * Result values returned to client : <? echo implode(", ",array_keys($outputs_for_client)); ?>
 *
 * Server Side session vars required : <? echo implode(", ",array_keys($args_from_server)); ?>
 * Server Side session vars output : <? echo implode(", ",array_keys($outputs_for_server)); ?>
 *
 * All vars affected                        : <? echo implode(", ",array_keys($affected)); ?>
 */
<?  }
}?>
class <? echo $funcname ;? > extends generatedCodeRoot {
   function evaluate(&$state) {
      <? if ($uses_session) { ?> $this->consider_sessionid($state['sessionid']) ;<? }?>
      <? if ($reads_session) foreach($args_from_server as $argname=>$dummy) { ?>
      $state['<?echo $argname;?>'] = cast_to_array($this->session-> <? echo $argname;?>);
      <? } ?>
      <? echo ($is_expression ? "\$result = " : "") . $this->genphp( );?>;
      <? if ($writes_session) foreach($outputs_for_server as $outname => $dummy) { ?>
      $this->session-><?echo $outname;?> = $state['<?echo $outname;?>'];
      <? }?>
      <?
      $outvalues = array( );
      if ($outputs_for_client) foreach($outputs_for_client as $outname => $dummy) {
         $outvalues [$outname] = "\$this->convert_for_client(\$state['$outname'])";
      }
      if ($is_expression) $outvalues['result'] = "\$result";
      $outvalues ['sessionid'] = $uses_session ? '$this->sessionid' : '$state[\'sessionid\']';
      $outlines = array( );
      foreach($outvalues as $kk=>$vv) $outlines[] = "'$kk' => $vv ";
      ?>
      return($this->result(array(
         <? echo implode(",\n                        ",$outlines); ?>
         <? if (false) {?>
         <? if ($outputs_for_client) foreach($outputs_for_client as $outname => $dummy) { ?>
         '<? echo $outname;?>' => $this->convert_for_client($state['<?echo $outname;?>']),<? }?>
         <? if ($is_expression) { ?>'result' => $result, <?}?>
         'sessionid' => <? echo $uses_session ? '$this->sessionid' : '$state[\'sessionid\']';?>
         <?}?>
      )));
   }
}
```
In some embodiments, code generation can include generating code for the client, using a conventional compiler. Each server_side_call is code can be generated via macro expansion. For example, the code can be:
```
$out_var_names = array( );
$affected_sdvars = array( );
foreach($outputs_for_client as $outname => $dummy) $out_var_names[ ]="$outname:true ";
foreach($affected as $outname => $dummy) $affected_sdvars[ ] ="sdvar('$outname')";
// generate the javascript
?>DGcloud.generated_code_call({
   Env:Env,
   uses_session : <? echo $uses_session ? 'true':'false';?>,
   code_id:'<? echo $funcname;?>',
   driven_var_names:{<?echo implode(",",$out_var_names); ?>},
   affected_sdvars:[<?echo implode(",",$affected_sdvars); ?>]
```

```
    },{
<?foreach($args_from_client as $argname=>$dummy) { ?>
    <?echo $argname;?> : Env.<? echo $argname;?>,
<? }?>
})
.catch(function(e){catch_error(e);})<? if ($writes_session || $checks_session || $outputs_to_client) { ?>
.then(function(returnvals) {
   return Promise.resolve(<? echo $is_expression ? "returnvals.result" : "true";?>);
})<? } else {
   ?>;<?
}
```

Example 7—Argument Analysis Structure

In some embodiments, the variable to be passed to, or returned from, the calls, can be identified and stored within an argument analysis structure, which can be used to generate the code for the API calls. The following is example code:

```
/**
 * Structure to hold information related to arguments and outputs for a call to the server
 * (e.g., a server side section that is not nested inside a higher level one)
 *
 */
class argument_analysis {
   // these are all part of the interface and accessible publiclly
   var $args = array( );                                //[name]=>true
   var $outputs = array( );                             //[name]=>true
   var $args_from_server = array( ); //[name]=>true
   var $outputs_for_client = array( );                  //[name]=>true
   var $outputs_for_server = array( );                  //[name]=>true
   /**
    * makes sure that there is an argument with a given name.
    * creates one if it isnt there
    *
    * @param string $argname
    */
   public function declare_argument($argname) {
      if (!isset($this->args[$argname])) $this->args[$argname] = true;
   }
   /**
    * makes sure that there is an output with a given name
    * creates one if it isnt there
    *
    * @param string $argname
    */
   public function declare_output($varname) {
      if (!isset($this->outputs[$varname])) $this->outputs[$varname] = true;
   }
   /**
    * Specifies that a given argument should come from the server (e.g., read from the session)
    * and not sent by the client . declares the argument if it doesnt exist
    *
    * @param string $argname
    */
   public function argument_should_be_read_from_server($argname) {
      $this->declare_argument($argname);
      $this->args_from_server[$argname] = true;
   }
   /**
   * specifies that a given variable is an output that should be sent (returned)
   * to the client. declsares the output if there isnt one with that name
   *
   * @param string $varname
   */
   public function output_should_be_sent_to_client($varname) {
      $this->declare_output($varname);
      $this->outputs_for_client[$varname] = true;
   }
   /**
   * specifies that a given variable is an output that should be kept on the server for later
   * (e.g., retained and attached to the session)
   * declsares the output if there isnt one with that name
   *
```

```
 * @param string $varname
 */
public function output_should_be_retained_on_server($varname) {
    $this->declare_output($varname);
    $this->outputs_for_server[$varname] = true;
}
}
```

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™ Pager, Smartphone, or any other reasonable mobile electronic device.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

Clause 1. A system including: at least one processor in communication with at least one non-transitory computer-readable medium having software instructions stored thereon, where, upon execution of the software instructions, the at least one processor is configured to: receive source code associated with at least one software application; where the at least one software application is configured to be executed on a combination of a client device and a server; where the source code includes a plurality of code fragments; where each code fragment of the plurality of code fragment includes a plurality of parts of speech including at least one syntactic type; where the at least one syntactic types includes at least one of: a statement, an expression, or a variable reference; identify, based at least in part on enhanced parsing by a decision mechanism and the at least one syntactic type, the plurality of parts of speech in each code fragment; generate at least one parsed data tree for each code fragment, the at least one parsed data tree including a plurality of nodes, each node representing at least one part of speech of the plurality of parts of speech; where each node includes a location-aware code state indicative of a processing location of the at least one part of speech associated with each node; identify, based at least in part on the enhanced parsing by the decision mechanism and the at least one parsed data tree for each node of each code fragment, a processing location for each part of speech; where the location-aware code state of each node includes a data structure defining the processing location; where the processing location represents: a client-side execution location including the client device, a server-side execution location including the server, or an agnostic execution location; determine, based on the at least one parsed data tree, at least one software interface call between at least one first code segment and at least one second code segment; where the at least one first code segment includes at least one first part of speech being associated with at least one first node having the client-side execution location and the at least one second code segment includes at least one second part of speech being associated with at least one second node having the server-side execution location based at least in part on the location code states; determine, based on the at least one first code segment and the at least one second code segment, data exchanged between the at least one first code segment and the at least one second code segment via the at least one software interface call; and insert, into the source code, the at least one software interface call configured to enable an exchange of the data.

Clause 2. The system of clause 1, where the at least one processor is further configured to: receive one or more communication selections via a graphical user interface, where the one or more communication selections of the at least one client application is at least one client diagram is representative of the client application, and where the one or more application selections of the at least one server application is at least one server diagram is representative of the server application.

Clause 3. The system of clause 1, where the at least one software interface call includes: at least one client reference to the at least one client application, at least one server reference to the at least one server application, a server-specific syntax, a client-specific syntax, at least one client functionality of a plurality of functionalities associated with the at least one client application, and at least one server functionality of a plurality of functionalities associated with the at least one server application.

Clause 4. The system of clause 1, where the at least one processor is further configured to: receive one or more application selections via a graphical user interface, where the one or more application selections is a visual code diagram indicative of the plurality of code fragments for one or more parts of speech to occur between the client application and the server application.

Clause 5. The system of clause 4, where the at least one processor is further configured to: generate one or more nodes by parsing the one or more application selections, where each node corresponds to at least one of: a server-specific syntax, a client-specific syntax, and a functionality of a plurality of functionalities associated with the application; and parsing the one or more nodes of to generate the computer-readable code.

Clause 6. The system of clause 5, where the at least one processor is further configured to: assign a state to each node of the one or more nodes, where the state indicates that the node is associated with the client application or the server application.

Clause 7. The system of clause 5, where the at least one processor is further configured to: store, in an array, the state and a location for each of the server-specific syntax, the client-specific syntax, and the functionality of the plurality of functionalities.

Clause 8. The system of clause 1, where the client application is a client instance of the client application, and where the server application is a server instance of the server application.

Clause 9. The system of clause 1, where the at least one processor is further configured to: identifying a natural language ending at each code fragment; parsing, based on initial analysis state, at each natural language ending, a subset of the plurality of code fragments associated with at least one functional communication to extract the at least one parsed data tree of location-aware code states; and storing, based on the parsing, the at least one parsed data tree of location-aware code states.

Clause 10. The system of clause 9, where the at least one processor is further configured to: identifying, in the plurality of code fragments, one or more internal system global variables including one or more types and one or more locations; and allocating the initial analysis state based on the one or more internal system global variables including the one or more types and the one or more locations.

Clause 11. The system of clause 1, where the at least one processor is further configured to: assign a state to each node of the one or more nodes, where the assigned state includes at least one of: a start state based on one or more first characters before a natural language input, an end state based on one or more second characters after the natural language input, and a self-analysis state based on the natural language input.

Clause 12. The system of clause 1, where generating the computer-readable code includes: generate, based on the at least one software interface call, a first set of computer-readable code including a plurality of: at least one client software interface call to be executed by the at least one client application at the at least one client device to cause the at least one client application to perform at least one first client function, the at least one server application to perform the at least one first server function, or both; identify a subset of the at least one software interface call to be executed by the at least one client application; and generate, based on the subset of the at least one software interface call, a second set of computer-readable code including a plurality of: at least one server software interface call to be executed by the at least one server application at the at least one server device to cause at least one of the at least one server application to perform the at least one second server function, the at least one client application to perform at least one client function, or both.

Clause 13. The system of clause 1, where parsing further includes: identifying, based on a configuration file that defines functions between server-side and client-side, between the at least one functional client instruction, the at least one functional server instruction, and the at least one functional communication instruction.

Clause 14. The system of clause 11, where the at least one processor is further configured to: update, based on changes to the natural language input, the state assigned to the node among the start state, the end state, and the self-analysis state.

Clause 15. The system of clause 1, where generating further includes: analyze each node to identify one or more input variables and one or more output variables from at least one of: a server-specific syntax, a client-specific syntax, and a functionality of a plurality of functionalities; and generating the computer-readable code based on the one or more input variables and the one or more output variables.

Clause 17. A method including: receiving, by at least one processor, source code associated with at least one software application; where the at least one software application is configured to be executed on a combination of a client device and a server; where the source code includes a plurality of code fragments; where each code fragment of the plurality of code fragment includes a plurality of parts of speech including at least one syntactic type; where the at least one syntactic types includes at least one of: a statement, an expression, or a variable reference; identifying, by at least one processor based at least in part on enhanced parsing by a decision mechanism and the at least one syntactic type, the plurality of parts of speech in each code fragment; generating, by at least one processor, at least one parsed data tree for each code fragment, the at least one parsed data tree including a plurality of nodes, each node representing at least one part of speech of the plurality of parts of speech; where each node includes a location-aware code state indicative of a processing location of the at least one part of speech associated with each node; identifying, by at least one processor based at least in part on the enhanced parsing by the decision mechanism and the at least one parsed data tree for each node of each code fragment, a processing location for each part of speech; where the location-aware code state of each node includes a data structure defining the processing location; where the processing location represents: a client-side execution location including the client device, a server-side execution location including the server, or an agnostic execution location; determining, by at least one processor, based on the at least one parsed data tree, at least one software interface call between at least one first code segment and at least one second code segment; where the at least one first code segment includes at least one first part of speech being associated with at least one first node having the client-side execution location and the at least one second code segment includes at least one second part of speech being associated with at least one second node having the server-side execution location based at least in part on the location code states; determining, by at least one processor, based on the at least one first code segment and the at least one second code segment, data exchanged between the at least one first code segment and the at least one second code segment via the at least one software interface call; and inserting, by at least one processor, into the source code, the at least one software interface call configured to enable an exchange of the data.

Clause 18. The method of clause 17, further including: receiving, by at least one processor, one or more communication selections via a graphical user interface, where the one or more communication selections of the at least one client application is at least one client diagram is representative of the client application, and where the one or more application selections of the at least one server application is at least one server diagram is representative of the server application.

Clause 19. The method of clause 17, further including: generating, by at least one processor, one or more nodes by parsing the one or more application selections, where each node corresponds to at least one of: a server-specific syntax, a client-specific syntax, and a functionality of a plurality of functionalities associated with the application; and parsing, by at least one processor, the one or more nodes of to generate the computer-readable code.

Clause 20. The method of clause 17, further including: identifying, in the plurality of code fragments, one or more internal method global variables including one or more types and one or more locations; and allocating the initial analysis state based on the one or more internal method global variables including the one or more types and the one or more locations.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

The invention claimed is:

1. A system comprising:
  at least one processor in communication with at least one non-transitory computer-readable medium having software instructions stored thereon, wherein, upon execution of the software instructions, the at least one processor is configured to:
    receive mobile software application input comprising a plurality of:
      a plurality of operations,
      a plurality of candidate operations,
      a plurality of statements, and
      a plurality of constraints;
    identifying, in the mobile software application input, one or more internal system global variables comprising one or more types and one or more locations;
    allocating the initial analysis state based on the one or more internal system global variables comprising the one or more types and the one or more locations;
    generate, using at least one code generator of the mobile application generator, at least one mobile software application architecture by:
      iteratively, for each operation or candidate operation:
        identifying a natural language ending at each portion of a plurality of portions of the mobile software application input;
        parsing, based on an initial analysis state, at each natural language ending, a subset of the mobile software application input associated with at least one functional communication to extract the at least one current operation-specific analysis data tree of location-aware code states;
storing, based on the parsing, the at least one current operation-specific analysis data tree of location-aware code states;
generate the at least one current operation-specific analysis data tree to form a current universe of current operation-specific analysis data trees for the mobile software application input;
wherein the at least one current operation-specific analysis data tree comprises a current plurality of nodes comprising a current plurality of operation-specific assumptions defining, within the mobile software application architecture, at least one of:
a variable,
an activity, or
a processing location;
generate a current plurality of groupings of nodes within the at least one current operation-specific analysis data tree based least in part on:
the variable,
the activity, and
the processing location;
wherein the plurality of groupings of nodes correspond to a plurality of functionalities of the mobile software application;
generate at least one subsequent operation-specific analysis data tree based at least in part on the current plurality of groupings of nodes to form a subsequent universe of subsequent operation-specific analysis data trees for the mobile software application input;
wherein the at least one subsequent operation-specific analysis data tree comprises a subsequent plurality of nodes comprising a subsequent plurality of operation-specific assumptions;
wherein the subsequent plurality of operation-specific assumptions is different from the current plurality of operation-specific assumptions;
generate a subsequent plurality of groupings of nodes within the at least one subsequent operation-specific analysis data tree;
wherein the subsequent plurality of groupings of nodes are different from the current plurality of groupings of nodes;
terminate iterations upon the subsequent plurality of groupings of nodes satisfying at least one validity test;
generate, based on the at least or tert call, a first set of computer-readable code comprising a plurality of:
at least one client software interface call to be executed by at least one client application at the at least one client device to cause the at least one client application to perform at least one first client function, at least one server application to perform at least one first server function, or both;
identify a subset of the at least one software interface call to be executed by the at least one client application; and
generate, based on the subset of the at least one software interface call, a second set of computer-readable code comprising a plurality of:
at least one serve software interface call to be executed by be at least one server application at the at least one server device to cause at least one of the at least one server application to perform the at least one second server function, the at least one client on to perform at least one client function, or both; and
automatically output the at least one mobile software application architecture to produce the at least one mobile software application executable to be executed on a combination of a client device and a server;
wherein the at least one mobile software application architecture comprises at least:
client-side code corresponding to the subsequent plurality of groupings of nodes having the processing location comprising a client-side processing location,
server-side code corresponding to the subsequent plurality of groupings of nodes having the processing location comprising a server-side processing location, and
at least one application programming interface call between the client-side code and the server-side code.

2. The system of claim 1, wherein the at least one processor is further configured to:
receive one or more communication selections via a graphical user interface,
wherein the one or more communication selections of the at least one client application is at least one client diagram is representative of the client application, and
wherein the one or more application selections of the at least one server application is at least one server diagram is representative of the server application.

3. The system of claim 1, wherein the at least one software interface call comprises:
at least one client reference to the at least one client application,
at least one server reference to the at least one server application,
a server-specific syntax,
a client-specific syntax,
at least one client functionality of a plurality of functionalities associated with the at least one client application, and
at least one server functionality of a plurality of functionalities associated with the at least one server application.

4. The system of claim 1, wherein the at least one processor is further configured to:
receive one or more application selections via a graphical user interface,
wherein the one or more application selections is a visual code diagram indicative of the mobile software application input for one or more parts of source code to occur between the client application and the server application.

5. The system of claim 4, wherein the at least one processor is further configured to:
generate one or more nodes by parsing the one or more application selections, wherein each node corresponds to at least one of:
a server-specific syntax,
a client-specific syntax, and
a functionality of a plurality of functionalities associated with the application; and
parsing the one or more nodes of to generate computer-readable code.

6. The system of claim 5, wherein the at least one processor is further configured to:
assign a state to each node of the one or more nodes, wherein the state indicates that the node is associated with the client application or the server application.

7. The system of claim 5, wherein the at least one processor is further configured to:
store, in an array, a state and a location for each of
the server-specific syntax,
the client-specific syntax, and
the functionality of the plurality of functionalities.

8. The system of claim 1,
wherein the client application is a client instance of the client application, and
wherein the server application is a server instance of the server application.

9. The system of claim 1, wherein the at least one processor is further configured to:
assign a state to each node, wherein the assigned state comprises at least one of:
a start state based on one or more first characters before a natural language input,
an end state based on one or more second characters after the natural language input, and
a self-analysis state based on the natural language input.

10. The system of claim 9, wherein the at least one processor is further configured to:
update, based on changes to the natural language input, the state assigned to the node among the start state, the end state, and the self-analysis state.

11. The system of claim 1, wherein parsing further comprises:
identifying, based on a configuration file that defines functions between server-side and client-side, between:
at least one functional client instruction,
at least one functional server instruction, and
at least one functional communication instruction.

12. The system of claim 1, wherein generating further comprises:
analyze each node to identify one or more input variables and one or more output variables from at least one of:
a server-specific syntax,
a client-specific syntax, and
a functionality of a plurality of functionalities; and
generating the computer-readable code based on the one or more input variables and the one or more output variables.

13. A method comprising:
receiving, by at least one processor, mobile software application input comprising a plurality of:
a plurality of operations,
a plurality of candidate operations,
a plurality of statements, and
a plurality of constraints;
identifying, in the mobile software application input, one or more internal system global variables comprising one or more types and one or more locations;
allocating the initial analysis state based on the one or more internal system global variables comprising the one or more types and the one or more locations;
generating, by at least one processor, using at least one code generator of the mobile application generator, at least one mobile software application architecture by:
iteratively, for each operation or candidate operation:
identifying a natural language ending at each portion of a plurality of portions of the mobile software application input;
parsing, based on an initial analysis state, at each natural language ending, a subset of the mobile software application input associated with at least one functional communication to extract the at least one current operation-specific analysis data tree of location-aware code states;
storing, based on the parsing, the at least one current operation-specific analysis data tree of location-aware code states;
generate the at least one current operation-specific analysis data tree to form a current universe of current operation-specific analysis data trees for the mobile software application input;
wherein the at least one current operation-specific analysis data tree comprises a current plurality of nodes comprising a current plurality of operation-specific assumptions defining, within the mobile software application architecture, at least one of:
a variable,
an activity, or
a processing location;
generate a current plurality of groupings of nodes within the at least one current operation-specific analysis data tree based least in part on:
the variable,
the activity, and
the processing location;
wherein the plurality of groupings of nodes correspond to a plurality of functionalities of the mobile software application;
generate at least one subsequent operation-specific analysis data tree based at least in part on the current plurality of groupings of nodes to form a subsequent universe of subsequent operation-specific analysis data trees for the mobile software application input;
wherein the at least one subsequent operation-specific analysis data tree comprises a subsequent plurality of nodes comprising a subsequent plurality of operation-specific assumptions;
wherein the subsequent plurality of operation-specific assumptions is different from the current plurality of operation-specific assumptions;
generate a subsequent plurality of groupings of nodes within the at least one subsequent operation-specific analysis data tree;
wherein the subsequent plurality of groupings of nodes are different from the current plurality of groupings of nodes;
terminate iterations upon the subsequent plurality of groupings of nodes satisfying at least one validity test;
generate, based on the at least or tert call, a first set of computer-readable code comprising a plurality of:
at least one client software interface call to be executed by at least one client application at the at least one client device to cause the at least one client application to perform at least one first client function, at least one server application to perform at least one first server function, or both;
identify a subset of the at least one software interface call to be executed by the at least one client application; and generate, based on the subset of the at least one software interface call, a second set of computer-readable code comprising a plurality of:
at least one serve software interface call to be executed by be at least one server application at the at least one server device to cause at least one of the at least one server application to perform the at least one second server function, the at least one client on to perform at least one client function, or both; and
automatically outputting, by the at least one processor, the at least one mobile software application architecture to produce the at least one mobile software application executable to be executed on a combination of a client device and a server;
wherein the at least one mobile software application architecture comprises at least:
client-side code corresponding to the subsequent plurality of groupings of nodes having the processing location comprising a client-side processing location,
server-side code corresponding to the subsequent plurality of groupings of nodes having the processing location comprising a server-side processing location, and
at least one application programming interface call between the client-side code and the server-side code.

14. The method of claim 13, further comprising:
receiving, by at least one processor, one or more application selections via a graphical user interface,
wherein the one or more application selections is at least one visual code diagram indicative of the mobile software application input for one or more parts of source code to occur between the client application and the server application.

15. The method of claim 14, further comprising:
generating, by at least one processor, one or more nodes by parsing the one or more application selections, wherein each node corresponds to at least one of:
a server-specific syntax,
a client-specific syntax, and
a functionality of a plurality of functionalities associated with the application; and
parsing, by at least one processor, the one or more nodes of to generate computer-readable code.

16. The method of claim 13, further comprising:
identifying, in the mobile software application input, one or more internal method global variables comprising one or more types and one or more locations; and
allocating the initial analysis state based on the one or more internal method global variables comprising the one or more types and the one or more locations.

* * * * *